United States Patent
Choi et al.

(10) Patent No.: US 10,445,045 B2
(45) Date of Patent: Oct. 15, 2019

(54) ELECTRONIC DEVICE AND METHOD OF PROCESSING INFORMATION IN ELECTRONIC DEVICE

(71) Applicant: SAMSUNG ELECTRONICS CO., LTD., Suwon-si, Gyeonggi-do (KR)

(72) Inventors: Min-Suk Choi, Suwon-si (KR); Jung-Yong Kim, Suwon-si (KR); Boo-Gun Min, Suwon-si (KR); Jae-Sick Shin, Siheung-si (KR); Dae-Ho Lee, Suwon-si (KR); Eun-Ok Shin, Suwon-si (KR); Hyun-A Jo, Goyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 281 days.

(21) Appl. No.: 14/995,589

(22) Filed: Jan. 14, 2016

(65) Prior Publication Data

US 2016/0202943 A1 Jul. 14, 2016

(30) Foreign Application Priority Data

Jan. 14, 2015 (KR) .................. 10-2015-0006873

(51) Int. Cl.
*G06F 3/048* (2013.01)
*G06F 3/14* (2006.01)
(Continued)

(52) U.S. Cl.
CPC ............ *G06F 3/1423* (2013.01); *G06F 3/017* (2013.01); *G06F 3/0484* (2013.01);
(Continued)

(58) Field of Classification Search
None
See application file for complete search history.

(56) References Cited

U.S. PATENT DOCUMENTS

2009/0037385 A1 2/2009 Min et al.
2010/0262673 A1 10/2010 Chang et al.
(Continued)

FOREIGN PATENT DOCUMENTS

EP 2 562 638 2/2013
EP 2 464 084 11/2013
(Continued)

OTHER PUBLICATIONS

Search Report and Written Opinion dated Jun. 15, 2016 in counterpart International Patent Application No. PCT/KR2016/000410.
(Continued)

*Primary Examiner* — William C Trapanese
(74) *Attorney, Agent, or Firm* — Nixon & Vanderhye P.C.

(57) ABSTRACT

A first electronic device may include: a display unit that displays an execution screen of an application executed in the first electronic device; and a processor configured to receive an input for transmitting contents related to one or more objects selected within the execution screen of the application to a second electronic device and to transmit the contents related to the one or more selected objects to the second electronic device in response to the input. The contents related to the one or more selected objects may be displayed in the second electronic device without being displayed on the execution screen of the first electronic device.

15 Claims, 23 Drawing Sheets

(51) Int. Cl.
  *G06F 3/0484* (2013.01)
  *G06F 3/01* (2006.01)
  *G06F 3/0488* (2013.01)
  *H04M 1/725* (2006.01)
  *G09G 5/14* (2006.01)
  *G09G 5/36* (2006.01)
  *G06F 3/16* (2006.01)

(52) U.S. Cl.
  CPC ........ *G06F 3/0488* (2013.01); *G06F 3/04842* (2013.01); *G06F 3/1438* (2013.01); *G06F 3/1454* (2013.01); *G09G 5/14* (2013.01); *G09G 5/363* (2013.01); *H04M 1/7253* (2013.01); *G06F 3/167* (2013.01); *G09G 2340/145* (2013.01); *G09G 2360/06* (2013.01); *G09G 2370/022* (2013.01); *G09G 2370/16* (2013.01)

(56) References Cited

U.S. PATENT DOCUMENTS

| 2010/0299436 | A1* | 11/2010 | Khalid | G06F 1/1643 709/226 |
| 2011/0081923 | A1 | 4/2011 | Forutanpour et al. | |
| 2011/0083111 | A1* | 4/2011 | Forutanpour | H04W 4/21 715/863 |
| 2012/0139951 | A1* | 6/2012 | Hwang | G06F 3/04883 345/665 |
| 2012/0159340 | A1* | 6/2012 | Bae | G06F 1/1626 715/738 |
| 2013/0332172 | A1 | 12/2013 | Prakash et al. | |
| 2014/0068520 | A1* | 3/2014 | Missig | G06F 3/0482 715/841 |
| 2014/0101606 | A1* | 4/2014 | Albrecht | G06F 3/0481 715/803 |
| 2014/0125580 | A1* | 5/2014 | Eun | G06F 3/017 345/156 |
| 2015/0074541 | A1* | 3/2015 | Schwartz | G06F 9/44 715/740 |
| 2015/0089005 | A1* | 3/2015 | Brown | H04L 67/02 709/206 |
| 2015/0253885 | A1* | 9/2015 | Kagan | G06F 16/248 368/10 |

FOREIGN PATENT DOCUMENTS

| KR | 10-2009-0013325 | 2/2009 |
| KR | 10-2012-0066879 | 6/2012 |
| KR | 10-2013-0132886 | 12/2013 |
| WO | 2013/056360 | 4/2013 |
| WO | WO 2014/137200 | 9/2014 |

OTHER PUBLICATIONS

Partial Supplementary Search Report dated Oct. 12, 2017 in counterpart EuropeanPatent Application No. 16737573.2.
Supplementary EP Search Report for EP Application No. 16737573.2 dated Feb. 6, 2018.
European Office Action dated Apr. 15, 2019 for EP Application No. 16737573.2.

* cited by examiner

ELECTRONIC DEVICE AND METHOD OF PROCESSING INFORMATION IN ELECTRONIC DEVICE

CROSS-REFERENCE TO RELATED APPLICATION

This application is based on and claims priority under 35 U.S.C. § 119 to Korean Application Serial No. 10-2015-0006873, which was filed in the Korean Intellectual Property Office on Jan. 14, 2015, the disclosure of which is incorporated by reference herein in its entirety.

TECHNICAL FIELD

The disclosure relates to an electronic device and a method of processing information in an electronic device.

BACKGROUND

A recently used electronic device may include various functions for displaying information to provide information to a user or outputting the information as voice information.

Further, the electronic device may easily receive information in various fields or various forms through various communication schemes anywhere and at any time.

Due to a limited size of a screen of a display unit, an electronic device has a difficulty in displaying a large amount of information on the screen of limited size.

Further, a recently used electronic device may simultaneously execute various applications or programs, and provide various services by displaying information according to the execution to the user. Since various pieces of information should be provided, the electronic device may display additionally provided information through screen split, screen switching, or a popup window, in addition to the displayed information.

However, when the information is displayed through the screen split, screen switching, or popup window, a part of the currently executed screen is hidden or an entire screen is switched, so that it may be difficult to normally identify the information provided by the currently executed screen.

SUMMARY

Various examples of the disclosure may provide an electronic device operable to transmit, to a second electronic device, information (for example, contents) related to at least one object selected within an execution screen of an application executed in a first electronic device, and a method of processing information by an electronic device.

In accordance with an example of the disclosure, a first electronic device is provided. The first electronic device includes: a display that displays an execution screen of an application executed in the first electronic device; and a processor configured to receive an input for transmitting contents related to one or more objects selected within the execution screen of the application to a second electronic device and to transmit the contents related to the one or more selected objects to the second electronic device in response to the input.

In accordance with another example of the disclosure, a method of processing information by a first electronic device is provided. The method includes: executing an application in the first electronic device; receiving an input for transmitting contents related to one or more objects displayed within an execution screen of the application on the first electronic device to a second electronic device; and transmitting the contents related to the one or more selected objects to the second electronic device in response to the input.

Based on an electronic device and a method of processing information by an electronic device according to various examples, by transmitting, to a second electronic device, information related to at least one object selected within an execution screen of an application executed in a first electronic device, it is possible to display the information in the second electronic device without displaying the information on the execution screen of the first electronic device.

BRIEF DESCRIPTION OF THE DRAWINGS

The above and other aspects, features, and advantages of the disclosure will be more apparent from the following detailed description taken in conjunction with the accompanying drawings, in which like reference numerals refer to like elements, and wherein.

DETAILED DESCRIPTION

Figure 1:
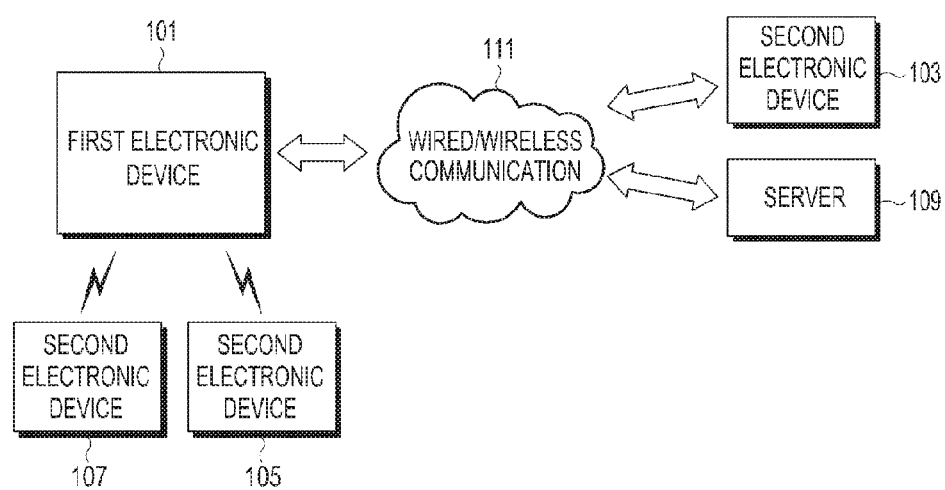
FIG. 1 is a diagram illustrating an example of a system for processing information.

The disclosure will be described with reference to the accompanying drawings. The disclosure may encompass various examples, and modifications and changes may be made therein. The disclosure will be described in conjunction with example embodiments illustrated in the accompanying drawings. However, it should be understood that there is no intent to limit the disclosure to the particular forms disclosed herein; rather, the disclosure should be construed to cover various modifications, equivalents, and/or alternatives of examples of the disclosure. In describing the drawings, similar reference numerals may be used to designate similar constituent elements.

In the disclosure, the expression "include" or "may include" refers to existence of a corresponding function, operation, or element, and does not limit one or more additional functions, operations, or elements. In the disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various examples of the disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (e.g., operatively or communicatively) "connected," or "coupled," to another element (e.g., second element), it may be directly connected or coupled directly to the other element or any other element (e.g., third element) may be interposed between them. Alternatively, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe example embodiments, and are not intended to limit the disclosure. As used herein, singular forms may include plural forms as well unless the context clearly indicates otherwise.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. A term defined in the disclosure should not be interpreted to exclude embodiments of the disclosure.

An electronic device according to various examples of the disclosure may refer to any device including at least one processor, and may, for example, include a camera, a portable device, a mobile terminal, a communication terminal, a portable communication terminal, a portable mobile terminal, and the like. The electronic device, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., watch type device, glasses type device, or clothes type device, such as smart glasses, a head-mounted-device (HMD), electronic clothes, an electronic bracelet, an electronic necklace, an electronic appcessory, an electronic tattoo, a smart mirror, or a smart watch), or the like.

According to some examples, the electronic device may, for example, be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like.

According to another example, the electronic device may, for example, include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS)

receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like.

According to some examples, the electronic device may, for example, include at least one of a part of furniture or a building/structure, an electronic board, an electronic signature receiving device, a projector, and various kinds of measuring instruments (e.g., a water meter, an electric meter, a gas meter, and a radio wave meter), or the like. The electronic device according to various examples of the disclosure may be a combination of one or more of the aforementioned various devices. The electronic device according to some examples of the disclosure may, for example, include a flexible device. Further, the electronic device according to an example of the disclosure is not limited to the aforementioned devices, and may include any electronic device, including a new electronic device according to the development of technology An electronic device according to various examples of the disclosure will be described with reference to the accompanying drawings.

In various examples, the term "user" may refer to a person using an electronic device or a device (e.g. an artificial intelligence electronic device) using an electronic device.

An object used in various examples may, for example, refer to data of an executed application or information related to the data, or information included in an execution screen of the executed application, or a part or a combination of the information, etc. According to various examples, the information included in the execution screen of the executed application may, for example, include at least one piece of data within the execution screen (for example, contents including at least one of text, an image, a dynamic image, and sound source information), an area (for example, position information), and information related to a frame or a menu, etc.

Source information on an object used in various examples may, for example, refer to information (for example, including at least one piece of address information (URL), information related to a query, and information corresponding to an object) used to acquire information (for example, contents related to at least one selected object) related to at least one object selected within an execution screen of an executed application. Further, the source information on the object used in various examples may, for example, refer to at least one piece of information (for example, Hypertext Markup Language (HML) document or an eXtensible Markup Language (XML) document) corresponding to the at least one object included in a structured document of the application and information related to a source from which the information is provided (for example, address information (URL)) or a request for or response to the information (for example, query), or the like.

The information related to the object used in various examples may, for example, correspond or refer to information shown in the second electronic device and may, for example, include at least one piece of information on an object selected within the execution screen of the application executed in the first electronic device, new information processed (for example, found or extracted) by the first electronic device in connection with the selected object, and new information processed and provided by a server in connection with the selected object, etc.

The term processing (processed) used in various examples may, for example, refer to a processor that makes corresponding new information, that is, information related to the object, by artificially processing at least one selected object or a processor that extracts information related to at least one selected object from the first electronic device or receives the information from the server.

FIG. 1 is a diagram illustrating an example of a system for processing information.

Referring to FIG. 1, the system may include a first electronic device 101 and one or more second electronic devices 103, 105, and 107. The system may further include a server 109 that may, for example, perform communication through a network 111 in a wired or wireless communication scheme.

According to various examples, the first electronic device 101 may communicate with the one or more second electronic devices 103, 105, and 107 through wired or wireless communication (for example, short range wireless communication) or communicate with at least one of the one or more second electronic devices 103, 105, and 107, and the server 109 through the network 111 via wired or wireless communication. Further, at least one of the second electronic devices 103, 105, and 107 may communicate with the server 109 through the network 111.

According to various examples, the first electronic device 101 may, for example, transmit information (for example, contents related to one or more selected objects) related to one or more objects selected within an execution screen of an executed application to the second electronic device 103, 105, or 107. Further, according to various examples, the first electronic device 101 may, for example, receive information related to the one or more selected objects from the server 109 by communicating with the server 109 through wired or wireless communication network 111, and transmit the received information related to the one or more objects to the second electronic device 103, 105, or 107.

According to various examples, the second electronic device 103, 105, or 107 may, for example, receive the information related to the one or more objects selected in the execution screen of the application executed in the first electronic device 101 from the first electronic device 101 or the server 109 to display the received information or output the information as voice information.

According to various examples, the server 109 may support operations of the first electronic device 101 and/or the second electronic device 103, 105, or 107 by performing at least one operation (or function) among the operations (or functions) implemented by the first electronic device 101 or the second electronic device 103, 105, or 107. For example, the server 109 may provide information for supporting a processor implemented in the first electronic device 101 or the second electronic device 103, 105, or 107, and may perform (or act as a proxy) at least one of the operations (or functions) performed by the processor. According to various examples, the server 109 may support information transmission/reception between the first electronic device 101 and the second electronic device 103, 105, or 107 and/or provide an application related to the information transmission/reception to the first electronic device 101 and the second electronic device 103, 105, or 107.

According to various examples, the communication network 111 for wired or wireless communication may, for example, include at least one of a computer network, the Internet, the Internet of things, and a telephone network, or the like. According to various examples, a protocol (for example, a transport layer protocol, a data link layer protocol, or a physical layer protocol) for communication between the first electronic device 101 or the second electronic device 103, 105, or 107 and an external device may be supported by at least one of an application, an application programming interface, middleware, a kernel, and a communication interface.

Figure 2:
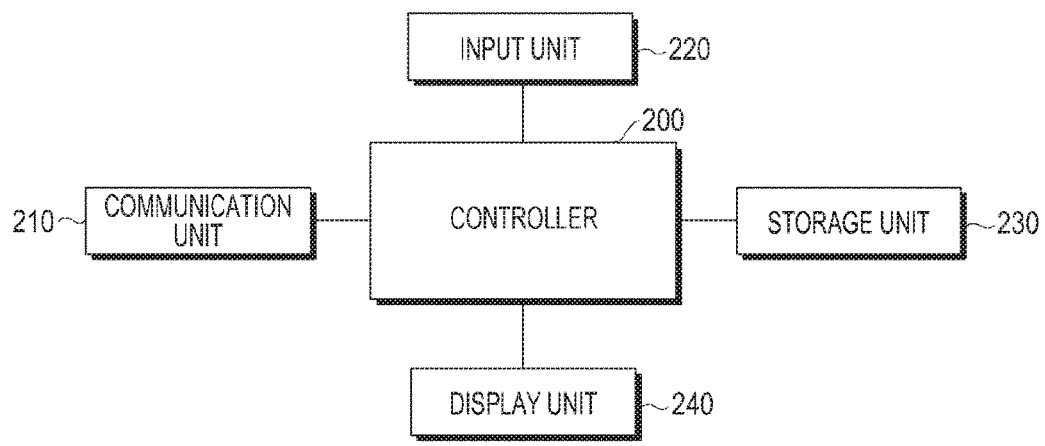
FIG. 2 is a block diagram illustrating an example of a configuration of an electronic device.

FIG. 2 is a block diagram illustrating an example of a configuration of an electronic device. The electronic device according to various examples of the disclosure may be, for example, the first electronic device 101 or the second electronic device 103, 105, or 107 of FIG. 1.

Referring to FIG. 2, according to various examples of the disclosure, the electronic device (for example, the first electronic device 101 or the second electronic device 103, 105, or 107 illustrated in FIG. 1) may include at least one of a controller 200, a communication unit (e.g., including communication circuitry) 210, an input unit (e.g., including input circuitry) 220, a storage unit (e.g. including a memory) 230, and/or a display unit (e.g., including a display) 240. In some examples, at least one of the components of the electronic device may be omitted, or other components may be additionally included.

For convenience of description, it is assumed that the first electronic device 101 serves to make a request for transmitting information (for example, contents related to one or more selected objects) related to one or more objects selected within an executed application to the second electronic device 103, 105, or 107, and the second electronic device 103, 105, or 107 receives the information related to the one or more selected objects. Further, both the first electronic device 101 and the second electronic device 103, 105, or 107 will be described with reference to FIG. 2.

In addition, communication according to various examples of the disclosure may, for example, be an effect, phenomenon, or action that exchanges information between electronic devices. According to various examples of the disclosure, the communication may include a plurality of communications as well as one communication previously performed between the first electronic device 101, the second electronic device 103, 105, or 107, and the server 109. According to various examples of the disclosure, the communication may include at least one of wired or wireless communication through a communication network, communication through a direct connection without passing through the communication network, and short range wireless communication, or the like.

Referring to FIG. 2, according to various examples of the disclosure, the controller 200 of the electronic device (for example, the electronic device 101 or the second electronic device 103, 105, or 107 illustrated in FIG. 1) may be configured to process information based on the operation of the electronic device or information (for example, contents) based on execution of an application or function, and to control the electronic device to display information based on the execution of the application on an execution screen.

According to various examples of the disclosure, the controller 200 of the first electronic device (for example, the first electronic device 101 of FIG. 1) may be configured to identify one or more objects selected within the execution screen of the executed application and to search for information related to the identified objects. When the information related to the one or more selected objects is acquired, the controller 200 may be configured to transmit the acquired information (for example, contents) related to the one or more objects to another electronic device (for example, the second electronic device 103, 105, or 107 of FIG. 1).

According to various examples of the disclosure, when the information related to the one or more objects is received from the first electronic device (for example, the first electronic device 101 of FIG. 1), the controller 200 of the second electronic device (for example, at least one of the second electronic devices 103, 105, and 107 of FIG. 1) may be configured to display the received information related to the one or more objects or to output voice information.

According to various examples of the disclosure, when one or more areas or positions are selected by the user within the execution screen of the executed application, the controller 200 of the first electronic device (for example, the first electronic device 101 of FIG. 1) may be configured to receive input information based on the selection and to identify the input information to identify one or more objects corresponding to the selected areas or positions. The controller 200 may be configured to receive input information on a command for transmitting information related to the one or more selected objects to the second electronic device. When the input for the command is received, the controller 200 may be configured to identify source information on the one or more identified objects and search for or make a request for the information related to the one or more objects to the server based on the source information.

According to various examples of the disclosure, the controller 200 of the first electronic device may be configured to not display the received information related to the one or more objects found or received from the server on a current execution screen of the display unit 240. Further, the controller 200 may be configured to transmit the information related to the one or more objects to the second electronic device.

According to various examples of the disclosure, when transmitting a message making a request for the information related to the one or more selected objects to the server, the controller 200 of the first electronic device may be configured to insert source information on the one or more selected objects into the message and to transmit the message. Further, the controller 200 may be configured to further insert information, which makes the server directly transmit the information related to the one or more selected objects, and identification information on the second electronic device into the message and to transmit the message.

According to various examples of the disclosure, the controller 200 of the first electronic device may be configured to acquire the information related to one or more objects selected within the execution screen of the currently executed application through another application. According to various examples, when the one or more selected objects are text, the controller 200 may be configured to search for information based on the selected text through an application (for example, at least one of services such as a dictionary, translation, search, map, positioning, text message, or messenger or one of various services provided by the first electronic device which can search for text) which can search for information related to the selected text. According to various examples, when the one or more selected objects are images, the controller 200 may be configured to search for information related to the selected images through an application (for example, at least one of services related to an album (gallery), image search, and camera) which can search for information related to the image. Further, as described above, when searching for information related to one or more objects selected through another application, the controller 200 of the first electronic device may be configured to not display an execution screen of another application on the display unit 240 and may be configured to be linked with only a partial processing operation to acquire information.

Further, according to various examples of the disclosure, after one or more objects are selected in a previous execution screen by the user, the controller 200 of the first electronic device may be configured to receive a command for transmitting information related to the one or more selected objects to the second electronic device in a current switched execution screen. As the command is received, the controller 200 may be configured to search for the information related to the selected objects in the storage unit 230 or make a request for the information to the server in response to the command. Further, even though the controller 200 may be configured to acquire the information related to the selected objects, the controller 200 may be configured to not perform one or more operations such as screen split, screen switching, and popup window in order to display the acquired information. That is, the controller 200 may be configured to display the currently displayed execution screen and to display the acquired information in the second electronic device.

According to various examples of the disclosure, when the one or more selected pieces of information are updated, the controller 200 of the first electronic device may be configured to transmit the updated information to the second electronic device without displaying the updated information in the current execution screen.

According to various examples of the disclosure, the controller 200 of the first electronic device may be configured to search for a neighboring second electronic device, and to display one or more objects selected from found second electronic devices or to select a second electronic device which can be output by voice information. Further, the controller 200 may be configured to display identification information on the found second electronic devices on the execution screen.

According to various examples, the controller 200 of the electronic device (for example, the electronic device 101 or the second electronic device 103, 105, or 107 of FIG. 1) may further include an operation execution unit or circuitry (not shown) that executes operations of the electronic device. The operation execution unit or circuitry may be configured to perform an operation in response to an input, for example, a user input or a detected input. According to various examples, the operation execution unit or circuitry may be configured to control the display unit 240 to display an execution screen, an application, or information based on operation execution or to control various operations of the electronic device (for example, at least one of vibration generation, sound information output through a speaker, and an operation related to a camera module).

According to various examples of the disclosure, the controller 200 of the electronic device (for example, the first electronic device 101 or the second electronic device 103, 105, or 107 of FIG. 1) may, for example, be at least a part of the processor and include, for example, a combination of one or more of hardware (e.g., circuitry), software, and firmware.

According to various examples of the disclosure, at least a part of the configuration of the controller 200 of the electronic device (for example, the first electronic device 101 or the second electronic device 103, 105, or 107 of FIG. 1) may, for example, include some of at least one processor including a Central Processing Unit (CPU)/Micro Processing Unit (MPU) in hardware, a memory to which at least one piece of memory loading data is loaded (for example, a register and/or a Random Access Memory (RAM), and a bus that inputs/outputs one or more pieces of data to the processor and the memory. Further, the controller 200 may include, in software, a program routine or program data which is loaded to the memory from a recording medium to perform a function defined in the electronic device and processed by the processor.

According to various examples of the disclosure, the communication unit (e.g., communication circuitry) 210 included in the electronic device (for example, the first electronic device 101 or the second electronic device 103, 105, or 107 of FIG. 1) may be configured to communicate with another electronic device (not shown) or the server 109 through a communication interface. According to various examples, the communication unit 210 may be connected to the network 111 or perform communication between devices based on wired or wireless communication through the communication interface. The wireless communication may, for example, include at least one of, for example, Wi-Fi, Bluetooth (BT), Near Field Communication (NFC), Global Positioning System (GPS) and cellular communication (for example, LTE, LTE-A, CDMA, WCDMA, UMTS, WiBro, GSM or the like). The wired communication may, for example, include at least one of, for example, a Universal Serial Bus (USB), a High Definition Multimedia Interface (HDMI), Recommended Standard 232 (RS-232), and a Plain Old Telephone Service (POTS). The communication unit 210 may include all types of communication schemes which have been widely known or will be developed in the future as well as the aforementioned communication schemes.

Further, according to various examples, the communication unit (e.g., including communication circuitry) 210 may be configured to transmit/receive information under the control of the controller 200.

According to various examples of the disclosure, the communication unit 210 of the first electronic device (for example, the first electronic device 101 of FIG. 1) may, for example, be configured to receive information generated by analyzing one or more objects selected within the executions screen of the executed application (for example, source information on the selected objects (for example, an HTML document)) from the controller 200. Further, through the storage unit 230 included in the first electronic device or the communication network, the communication unit 210 may be configured to transmit a message for searching for information (for example, contents) related to the received information generated by analyzing the one or more objects to the server (for example, the server 109 of FIG. 1) through a bus (not shown). The communication unit 210 may receive information found based on the information generated by analyzing the one or more selected objects, for example, the information related to the one or more selected objects. The communication unit 210 may be configured to transmit a message making a request for transmitting the found information to the second electronic device (for example, the second electronic device 103, 105, or 107 of FIG. 1) to the server (for example, the server 109 of FIG. 1). Further, the communication unit 210 may be configured to transmit the found information to the second electronic device, for example, the second electronic device 103, 105, or 107 of FIG. 1.

According to various examples of the disclosure, the communication unit 210 of the first electronic device (for example, the first electronic device 101 of FIG. 1) may, for example, be configured to communicate with the second electronic device (for example, at least one the second electronic devices 103, 105, and 107 of FIG. 1) through a wired or wireless communication scheme or the communication network. According to various examples, the communication unit 210 may be configured to transmit a signal for searching for the second electronic device through, for example, short range wireless communication and to receive a response signal from the second electronic device in response to the transmitted signal. The communication unit 210 may be configured to transmit/receive messages for an access process with the selected second electronic device and to transmit an information transmission message including at least one piece of information related to one or more selected objects or to update information to the selected second electronic device.

According to various examples of the disclosure, the communication unit 210 of the first electronic device may be configured to transmit an information request message including at least one piece of source information related to the one or more selected objects, identification information on the second electronic device, and information making a request for directly transmitting information to the selected second electronic device. The communication unit 210 may be configured to receive at least one of the information transmission message including the found information related to the one or more objects or an information transmission result message from the server and to transmit the received message to the controller 200.

According to various examples of the disclosure, the input unit (e.g., including input circuitry) 220 of the electronic device (for example, the first electronic device 101 or the second electronic device 103, 105, or 107 of FIG. 1) may be configured to transmit a signal input in connection with various pieces of information such as number and character information input by the user, setting of various functions, and controlling of functions of the electronic device to the controller 200. Further, the input unit 220 may be configured to support a user input for executing an application that supports a particular function. The input unit 220 may, for example, include at least one of a key input such as a keyboard or a keypad, a touch input such as a touch sensor or a touch pad, a sound source input, various sensors, and a camera, or the like, and may, for example, further include the ability to receive a gesture input. In addition, the input unit 220 may include all types of input means which are being developed currently or will be developed in the future. According to various examples of the disclosure, the input unit 220 may be configured to receive information input by the user through a touch panel of the display unit 230 and to transmit the input information to the controller 200.

According to various examples of the disclosure, the input unit 220 of the first electronic device (for example, the first electronic device 101 of FIG. 1) may be configured to transmit input information which is input based on a selection of one or more objects within the execution screen of the application displayed on the display unit 240 to the controller 200. Further, the input unit 220 may be configured to transmit, to the controller 200, input information (for example, at least one of a touch input, key input, gesture input, or pen input) which is input based on a command for transmitting information related to one or more objects to the second electronic device (for example, the second electronic device 103, 105, or 107 of FIG. 1).

According to various examples of the disclosure, the storage unit (e.g., including a memory) 230 of the electronic device (for example, the first electronic device 101 or the second electronic device 103, 105, or 107 of FIG. 1) may temporarily store various pieces of data generated during the execution of a program as well as a program required for the operation of a function according to various examples. The storage unit 230 may largely include a program area and a data area. The program area may store pieces of information related to driving of the electronic device such as an Operating System (OS) that boots the electronic device. The data area may store transmitted/received data or generated data according to various examples. Further, the storage unit 230 may, for example, include at least one storage medium of a flash memory, a hard disk, a multimedia card micro type memory (for example, an SD or XD memory), a RAM, and a ROM.

According to various examples of the disclosure, the storage unit 230 of the first electronic device (for example, the first electronic device 101 of FIG. 1) may, for example, store at least one piece of information (for example, source information (HTML document) on the execution screen) related to the execution screen of the application executed on the current display unit 240 and information based on the execution or control of the application. Further, the storage unit 230 may store information (for example, information generated by analyzing objects selected from the source information on the execution screen of the application) generated by analyzing one or more objects selected within the execution screen of the executed application. The storage unit 230 may store information (for example, information related to the one or more selected objects) received based on a search request for the analyzed information.

According to various examples of the disclosure, the storage unit 230 of the second electronic device (for example, the second electronic device 103, 105, or 107 of FIG. 1) may store information (for example, information related to the one or more selected objects) received from the first electronic device or the server.

According to various examples of the disclosure, the display unit (e.g., including a display) 240 of the electronic device (for example, the first electronic device 101 and the second electronic device 103, 105, or 107 of FIG. 1) may display operation execution information and operation execution result information based on the control of the operation by the operation execution unit (not shown). The display unit 240 may, for example, display various pieces of information (for example, at least one of text, an image, a dynamic image, or a sound source) or output the information by sound information to the user. The display unit 240 may display, on a screen thereof, an input window or an input pad (for example, a button) through which at least one of various characters, numbers, and symbols can be input into the input window in various ways. Further, the display unit 240 may display a service execution screen based on an execution of various applications related to information transmission/reception.

According to various examples of the disclosure, the display unit 240 of the first electronic device (for example, the first electronic device 101 of FIG. 1) may display an execution screen of the executed application, and display a result screen based on a selection of one or more objects within the execution screen of the executed application (for example, display the selected objects through at least one method of highlighting the objects, blocking the objects, and displaying the objects with different colors or brightness, that is, display the selected objects to not cover the execution screen). Further, the display unit 240 may display one or more functions (for example, relevant services) applied based on the one or more selected objects and display information on the one or more second electronic devices (for example, the neighboring second electronic devices 103, 105, and 107 of FIG. 1). The display unit 240 may be configured to display the execution screen of the application, which is currently executed, without splitting or switching the screen or displaying a popup window while not displaying the information related to the one or more selected objects on the current execution screen.

According to various examples of the disclosure, the display unit 240 of the second electronic device (for example, the second electronic device 103, 105, or 107 of FIG. 1) may store information related to one or more objects received from the first electronic device or the server. When update information on the information related to the one or more objects is received, the display unit 240 may display the received update information.

According to various examples of the disclosure, when the display unit 240 of the electronic device (for example, the first electronic device 101 or the second electronic device 103, 105, or 107 of FIG. 1) is implemented in a touch screen form, the input unit 220 and/or the display unit 240 may correspond to the touch screen. When the display unit 240 is implemented in the touch screen form together with the input unit 220, the display unit 240 may display various pieces of information generated based on a touch action.

According to various examples, the display unit 240 of the electronic device (for example, the first electronic device 101 or the second electronic device 103, 105, or 107 of FIG. 1) may comprise at least one of a Liquid Crystal Display (LCD), a Thin Film transistor LCD (TFT-LCD), an Organic Light Emitting Diodes (OLEDs), LED, Active Matrix OLED (AMOLED), a flexible display, and a 3 dimensional display, or the like. Some of the displays may, for example, be implemented in a transparent type or a light transmission type so that the outside can be seen therethrough. The display may, for example, be implemented in a transparent display form including Transparent OLED (TOLED).

Further, locations of the main components of the electronic device (for example, the first electronic device 101 or the second electronic device 103, 105, or 107 of FIG. 1) illustrated in FIG. 2 may vary depending on various examples. In addition, components of the controller 200 are not limited to the components illustrated in FIG. 2, and the controller 200 may include various components that perform various functions.

As described above, the main components of the electronic device have been described through the electronic device (for example, the first electronic device 101 or the second electronic device 103, 105, or 107) of FIG. 1. However, not all components illustrated in FIG. 2 are necessary components. The electronic device may be implemented by a larger number of components than the illustrated components or a smaller number of components than the illustrated components. For example, the electronic device may further include a sound source output unit (for example, a speaker) (not shown) that converts a sound source corresponding to an electrical signal into an analog signal and outputs the analog signal.

Figure 3:
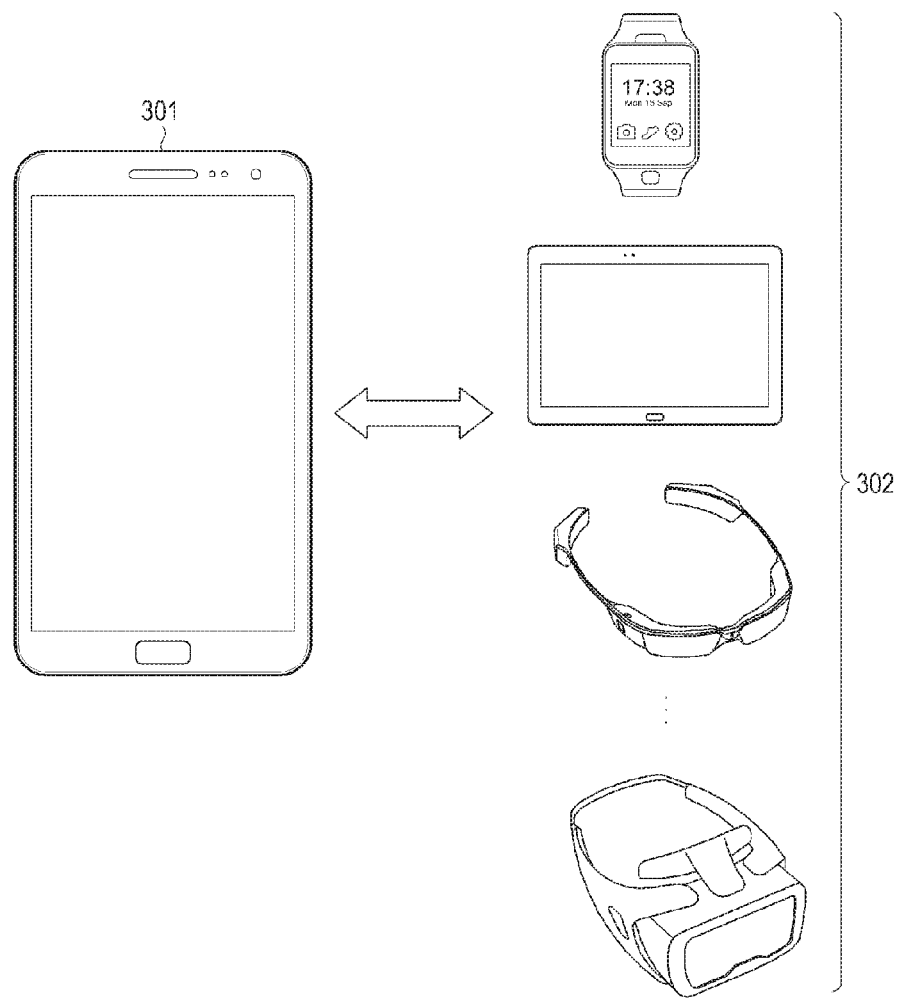
FIG. 3 is a diagram illustrating an example of a second electronic device that interworks with a first electronic device.

FIG. 3 is a diagram illustrating an example of a second electronic device that interworks with a first electronic device.

Referring to FIG. 3, a first electronic device 301 (for example, the first electronic device 101 of FIG. 1) may be, for example, a smart phone, and a second electronic device 302 (for example, the second electronic device 103, 105, or 107 of FIG. 1) that interworks with the first electronic device may, for example, be a device that may output information related to one or more objects selected within an execution screen of an application executed in the first electronic device 301, for example, a wearable device adjacent to the first electronic device 301. It will be understood that in various examples of the disclosure, the first electronic device 301 and the second electronic device 302 are not limited thereto. The wearable device may be, for example, a watch type device or a glasses type device, and may include at least one of, for example, smart glasses, a Head-Mounted-Device (HMD), electronic clothes, an electronic bracelet, an electronic necklace, an electronic appcessory, an electronic tattoo, a smart mirror, and a smart watch, or the like.

Further, the first electronic device 301 and the second electronic device 302 may be connected through a communication network. For example, the communication network may be implemented regardless of an aspect of communication such as wired/wireless communication, and may be implemented by various communication networks including a Personal Area Network (PAN), a Local Area Network (LAN), a Metropolitan Area Network (MAN), a Wide Area Network (WAN) and the like. Further, the communication network may be a known World Wide Web (WWW), and may use a wireless transmission technology utilized for short distance communication such as Infrared Data Association (IrDA) or Bluetooth, or the like. The communication network may include a cable broadcasting communication network, terrestrial broadcasting communication network, a satellite broadcasting communication network, and the like to receive a broadcasting signal.

When the first electronic device 301 and the second electronic device 302 are located with a short range, the first electronic device 301 and the second electronic device 302 may be connected by the communication circuitry, for example, a short range wireless communication means (for example, a Bluetooth communication means).

The first electronic device according to various examples of the disclosure may, for example, include a display unit that displays an execution screen of an application executed in the first electronic device; and a processor configured to receive an input for transmitting contents related to one or more objects selected within the execution screen of the application to a second electronic device and to transmit the contents related to the one or more selected objects to the second electronic device in response to the input.

According to various examples of the disclosure, when the contents related to the one or more selected objects are updated, the processor may be configured to transmit the updated contents to the second electronic device.

According to various examples of the disclosure, the processor may be configured to not display the contents related to the one or more selected objects on a current execution screen of the application.

According to various examples of the disclosure, the processor may be configured to search for contents related to the one or more selected objects, which may be pre-stored based on source information on the one or more objects.

According to various examples of the disclosure, the processor may be configured to request the contents related to the one or more selected objects from a server based on source information on the one or more selected objects and to receive the contents related to the one or more selected objects from the server based on the request.

According to various examples of the disclosure, the processor may be configured to request a server to directly transmit the contents related to the one or more selected objects to the second electronic device based on source information on the one or more selected objects and identification information on the second electronic device.

According to various examples of the disclosure, the processor may be configured to interwork with another application related to the one or more selected objects based on source information on the one or more selected objects and to acquire the contents related to the one or more selected objects through the other application.

According to various examples of the disclosure, when one or more gestures are input by a user, the processor may be configured to display one or more services or functions related to the one or more selected objects and to acquire contents related to the one or more selected objects for the one or more functions.

According to various examples of the disclosure, the processor may be configured to search for second electronic devices, which can perform communication, located near the first electronic device and to select, from the found second electronic devices, the second electronic device to display the contents related to the one or more selected objects or to output the contents through voice information.

According to various examples of the disclosure, when two or more second electronic devices near the first electronic device are found, the processor may be configured to display information on the two or more found second electronic devices on the execution screen.

According to various examples of the disclosure, when one or more objects are selected within a previous execution screen of the application and then one or more gestures are input on a switched current execution screen by a user, the processor may be configured to transmit information, which is acquired by searching for contents related to the one or more objects selected in the previous execution screen, to the second electronic device without displaying the information on the switched current execution screen.

A method of processing information in an electronic device according to various examples of the disclosure will be described in greater detail below with reference to the accompanying drawings.

Figure 4:
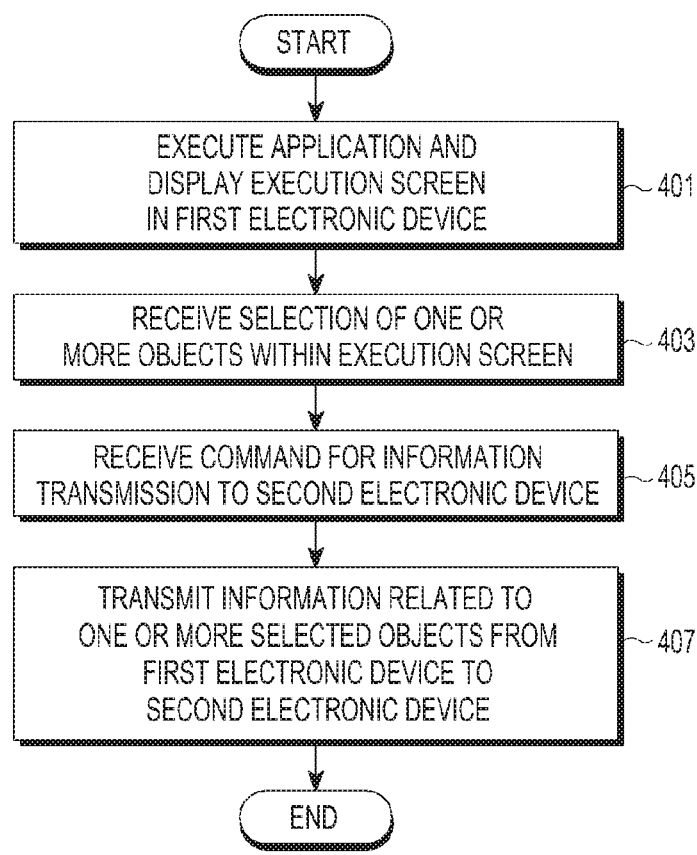
FIG. 4 is a flowchart illustrating an example operation process of the first electronic device.

FIG. 4 is a flowchart illustrating an example operation process of the first electronic device.

Referring to FIG. 4, according to various examples of the disclosure, the first electronic device (for example, the first electronic device 101 of FIG. 1 or the first electronic device 301 of FIG. 3) may be configured to execute an application and display an execution screen of the executed application in operation 401.

In operation 403, the first electronic device may receive a selection of one or more objects within the execution screen of the application in the first electronic device.

In operation 405, the first electronic device may receive a command for transmitting the one or more selected objects to the second electronic device. According to various examples, the command may, for example, be a user's gesture configured to transmit the one or more selected objects to the second electronic device. The gesture may refer to a motion made using a user's body part or a part of an object associated with the user, but is not limited to only a motion by a particular body part such as a finger or a hand. For example, the gesture may be construed as including various motions such as folding of an arm, a movement of a head, a movement using a pen, and the like. For example, the gesture may include operations such as a touch, release of a touch, rotation, a pinch, a spread, a touch drag, a flick, a swipe, a touch and hold, a tap, a double tap, a drag, a drag and drop, multi-swipes, a shake, rotate, and the like. Further, a touch state may include contact of a finger to a touch screen or very close access of the finger to the touch screen without actual contact. According to various examples of the disclosure, in a state where the display of the electronic device is covered with a cover, the user may make various gestures in an area displayed through a screen projection unit of the cover, thereby providing various application execution screens or transmitting the one or more selected objects to another device. At this time, various functions according to each user's situation may also be provided by using sensing information of various sensors provided from various sensors included in the electronic device according to various embodiments of the present disclosure.

In operation 407, in response to the input, the first electronic device may transmit contents related to the one or more selected objects to the second electronic device.

The method of processing information by the first electronic device according to one of the various examples of the disclosure may include executing an application in the first electronic device; receiving an input for transmitting contents related to one or more objects displayed within an execution screen of the application to a second electronic device; and transmitting the contents related to the one or more selected objects to the second electronic device in response to the input.

According to various examples of the disclosure, when the contents related to the one or more selected objects are updated, the method may further include transmitting the updated contents to the second electronic device.

According to various examples of the disclosure, the method may further include not displaying the contents related to the one or more selected objects on a current execution screen of the application.

According to various examples of the disclosure, transmitting the contents related to the one or more selected objects to the second electronic device may include searching for contents related to the one or more selected objects, which may be pre-stored based on source information on the one or more objects.

According to various examples of the disclosure, transmitting the contents related to the one or more selected objects to the second electronic device may include: making a request for the contents related to the one or more selected objects to a server based on source information on the one or more selected objects; receiving the contents related to the one or more selected objects from the server based on the request; and transmitting the received contents related to the one or more selected objects to the second electronic device.

According to various examples of the disclosure, transmitting the contents related to the one or more selected objects to the second electronic device may include: transmitting source information on the one or more selected objects and identification information on the second electronic device to a server; and receiving from the server, result information on the direct transmission of the contents related to the one or more objects found based on the source information to the second electronic device based on the identification information.

According to various examples of the disclosure, transmitting the contents related to the one or more selected objects to the second electronic device may include: interworking with another application related to the one or more selected objects based on source information on the one or more selected objects; acquiring the contents related to the one or more selected objects through the other application; and transmitting the acquired contents related to the one or more selected objects to the second electronic device.

According to various examples of the disclosure, transmitting the contents related to the one or more selected objects to the second electronic device may include: when one or more gestures are input by a user, displaying one or more services or functions related to the one or more selected objects; acquiring contents related to the one or more selected objects through at least one of the displayed services or functions; and transmitting the acquired contents related to the one or more selected objects to the second electronic device.

According to various examples of the disclosure, the method may further include, searching for second electronic devices, which can perform communication, located near the first electronic device; and selecting, from the found second electronic device, the second electronic device to display the contents related to the one or more selected objects or outputting the contents through voice information.

According to various examples of the disclosure, the method may further include, when two or more second electronic devices near the first electronic device are found, displaying information on the two or more found second electronic devices on the execution screen.

According to various examples of the disclosure, transmitting the contents related to the one or more selected objects to the second electronic device may include: after one or more objects are selected within a previous execution screen of the application, receiving one or more gestures by a user on a switched current execution screen; acquiring, on the switched current execution screen, contents related to the one or more objects selected within the previous execution screen; and transmitting the one or more acquired objects and acquired information to the second electronic device without displaying the one or more acquired objects and the acquired information on the current execution screen.

Various examples of the disclosure will be described in greater detail based on the configuration and operation of the electronic device as described above. In various examples of the disclosure, an area or position selected with an execution screen of the executed application may be described as one or more objects displayed within the execution screen corresponding to the selected area or position, and contents related to the one or more selected objects may be described as an example of information related to the one or more selected objects.

Figure 5:
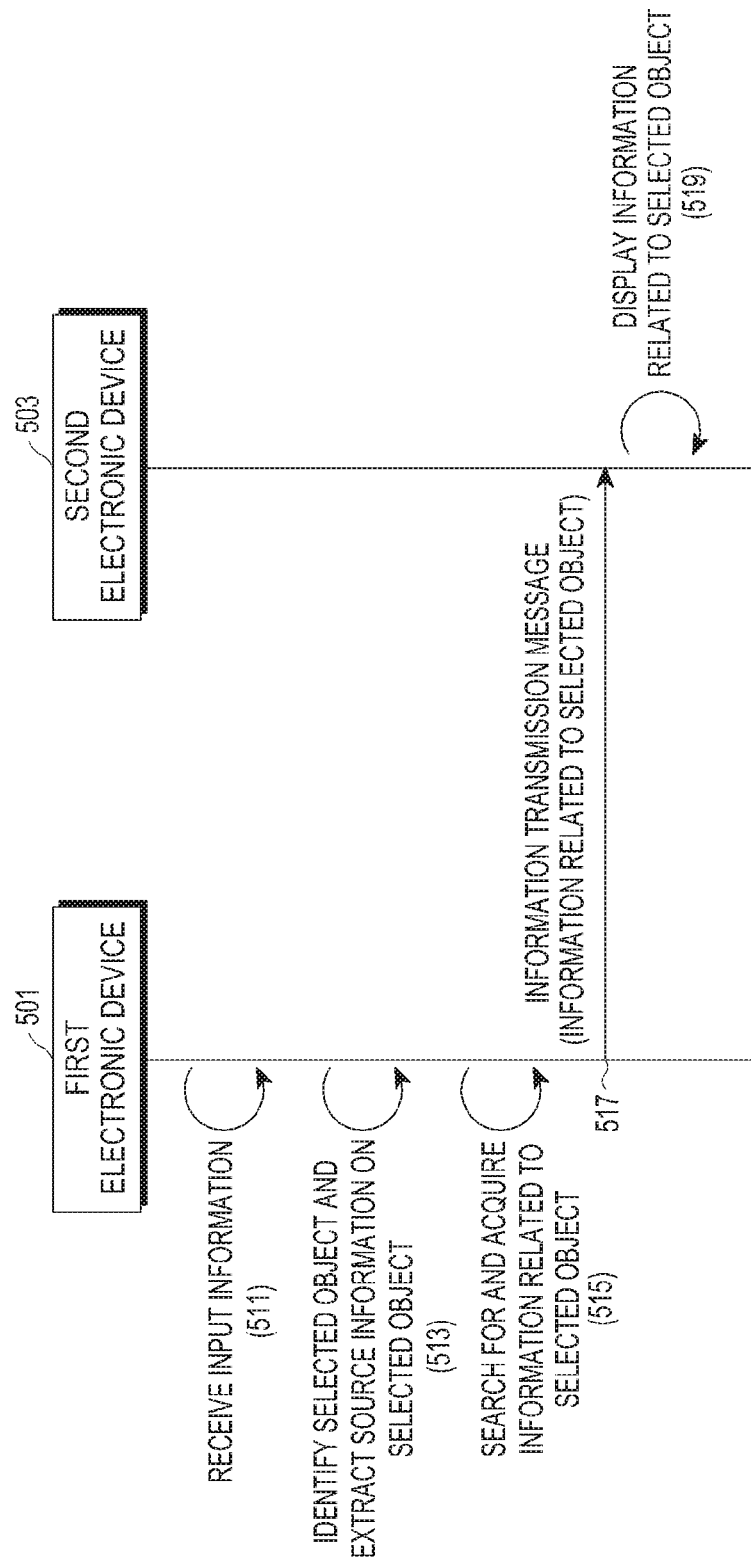
FIG. 5 is an operational diagram illustrating an example operation process for processing information between a first electronic device and a second electronic device.

FIG. 5 is an operational diagram illustrating an example operation process for processing information between a first electronic device and a second electronic device.

Referring to FIG. 5, according to various examples of the disclosure, when one or more objects are selected within an execution screen of an application executed by the user, a first electronic device 501 may receive first input information based on the selection of the one or more objects and second input information on a command (for example, a gesture) for transmitting the one or more selected objects to a second electronic device 503 in operation 511. The first input information and the second input information may be received by input operations of the user, respectively, but is not limited thereto and may be received by one input operation of the user. According to various examples, when the user selects objects corresponding to one or more positions or areas within the execution screen, commands for transmitting the selected objects may be simultaneously executed without a separate input of the user (for example, gesture) in response to the operation of selecting the objects by the user. For example, when the one or more objects are selected by the user, the first electronic device 501 may perform an operation for transmitting information (for example, contents) related to the one or more selected objects according to the input information according to the selection of the one or more objects without receiving input information on a separate transmission command.

In operation 513, the first electronic device 501 may identify the one or more selected objects based on the received first input information and may extract source information on the selected object(s). According to various examples, a controller may be configured to identify the first input information, for example, a position or area in which the selection is made by the user, and identify an object corresponding to the identified position or area.

In operation 515, the first electronic device 501 may acquire information on the one or more selected objects by searching for the information on the one or more selected objects in a storage unit (not shown).

In operation 517, the first electronic device 501 may transmit an information transmission message including the acquired information to the second electronic device 503 so that the second electronic device 503 may display the acquired information, for example, the information related to the one or more objects or output the information through sound information.

In operation 519, when the second electronic device 503 receives the information transmission message, the second electronic device 503 may display the information related to the one or more objects, which is included in the information transmission message, or output the information through sound information.

According to various examples, when the information related to the one or more objects is updated, the second electronic device may receive the updated information from the first electronic device, and display the updated information or output the updated information through sound information. According to various examples, when the information transmission message includes address information on the server or information-providing device that provides the information related to the one or more objects, the second electronic device 503 may directly receive the updated information from the corresponding server or information-providing device based on the address information, and display the updated information or output the updated information through sound information.

As described above, the first electronic device 501 may acquire the information related to the one or more selected objects by searching information stored in the storage unit and acquiring the information related to the one or more selected objects through an interworking with another application (for example, a second application) in addition to the currently executed application (for example, a first application).

Figure 6:
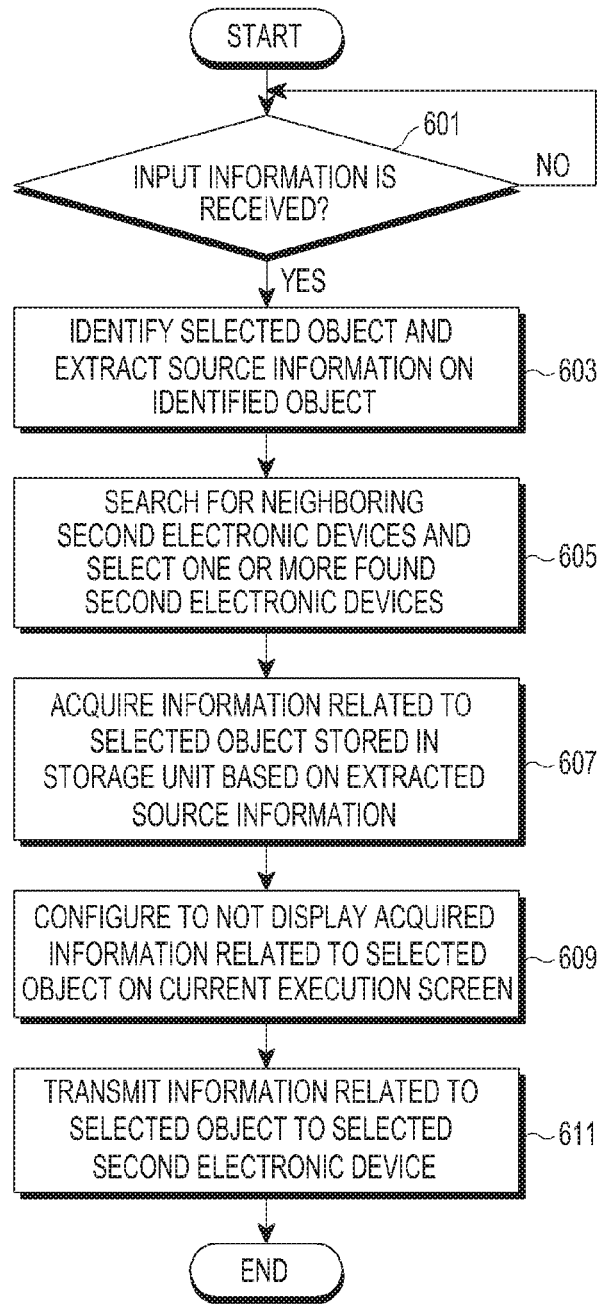
FIG. 6 is a flowchart illustrating an example operation process of a first electronic device.

FIG. 6 is a flowchart illustrating an example operation process of the first electronic device.

Referring to FIG. 6, for example, according to various examples of the disclosure, after one or more objects are selected within the execution screen of the executed application by the user, the first electronic device (for example, the first electronic device 501 of FIG. 5) may identify whether input information on a transmission command of the selected objects is received in operation 601.

When the input information is not received based on a result of the identification, the first electronic device 501 may continuously perform operation 601. When the input information on the transmission command is received, the first electronic device 501 may identify the one or more selected objects in operation 603. According to various examples, when a position or area in which the one or more objects are displayed within the execution screen is selected by the user, the first electronic device may identify position information on the selected position or area and extract source information corresponding to the position information identified from total source information of the execution screen.

When there is no second electronic device (for example, the second electronic device 103, 105, or 107 of FIG. 1 or the second electronic device 302 of FIG. 3) to which the information (for example, contents) related to the one or more presently selected objects will be transmitted, the first electronic device may search for one or more neighboring second electronic devices and select at least one second electronic device from the found second electronic devices in operation 605. Operation 605 may not be performed or the sequence thereof may be changed based on conditions. According to various examples, the first electronic device may not perform operation 605 when there is the second electronic device which has been already connected to the first electronic device.

In operation 607, the first electronic device may acquire information related to the one or more selected objects by searching information stored in the storage unit (for example, the storage unit 230 of FIG. 2) based on the extracted source information. According to various examples, the first electronic device may search for, in the stored contents, the information (for example, contents) related to the one or more objects including at least one piece of information included in the extracted source information. The contents may be at least one of the contents in the form of an image, text, dynamic image, sound source, or a combination thereof based on the execution of another application or function.

According to various examples, when the first electronic device interworks with another relevant application based on an information search request and the interworked application receives the information related to the one or more selected objects from an external device or the server and stores the received information, the first electronic device may search for and acquire the information related to the one or more objects. According to various examples, the first electronic device may acquire effective information, that is, the information (for example, contents) related to the one or more objects by filtering information related to a service or function selected or configured by the user among information found based on a configured condition.

In operation 609, the first electronic device may be configured to not display the acquired information, for example, the information related to the one or more selected objects on the current execution screen. In operation 611, the first electronic device may transmit the information related to the one or more selected objects to the selected second electronic device.

According to various examples, when an update event for the information related to the one or more selected objects is generated, the first electronic device may transmit updated information to the second electronic device.

Figure 7:
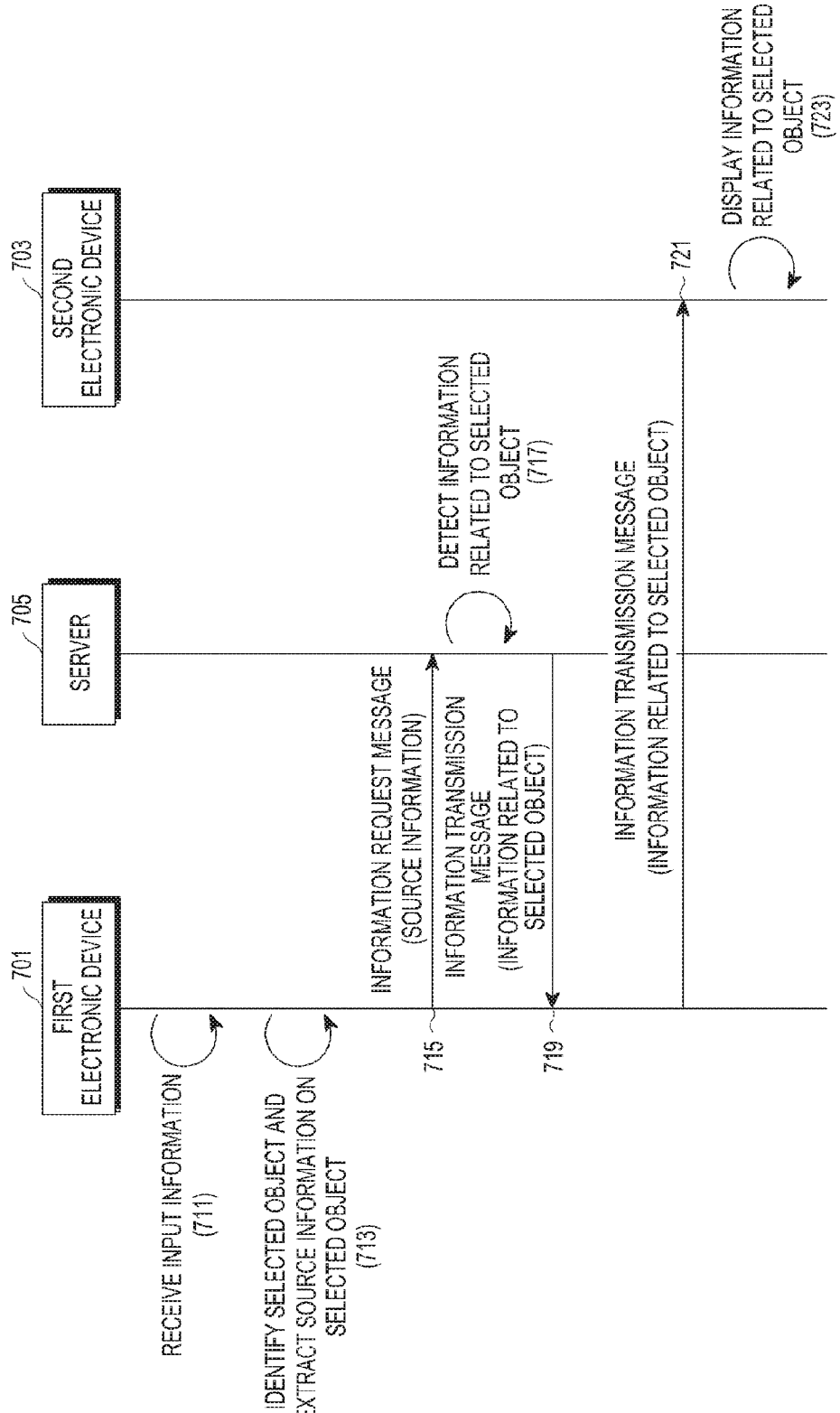
FIG. 7 is an operational diagram illustrating an example operation process for processing information between a first electronic device, a second electronic device, and a server.

FIG. 7 is an operational diagram illustrating an example operation process for processing information between a first electronic device, a second electronic device, and a server.

Referring to FIG. 7, according to various examples of the disclosure, when one or more objects are selected within an execution screen of an application executed by the user, a first electronic device 701 may receive first input information based on the selection of the one or more objects and second input information on a command (for example, including at least one of a touch input, a key input, a gesture, and a pen input) for transmitting the one or more selected objects to a second electronic device 703 in operation 711.

The first input information and the second input information may be received by input operations of the user, respectively, but is not limited thereto and may be received by one input operation of the user. According to various examples, when the user selects objects corresponding to one or more positions or areas within the execution screen, a transmission command of the selected objects may be input without a separate input of the user (for example, including at least one of a touch input, a key input, a gesture, and a pen input) in response to the operation of selecting the objects by the user. For example, when the one or more objects are selected by the user, the first electronic device 701 may perform an operation for transmitting information (for example, contents) related to the one or more selected objects according to the input information based on the selection of the one or more objects without receiving input information on a separate transmission command.

In operation 713, the first electronic device 701 may identify the one or more selected objects based on the received first input information. According to various embodiments, the first electronic device 701 may identify the first input information, for example, a position or area in which the selection is made by the user, and identify an object corresponding to the identified position or area. Further, the first electronic device 701 may identify or extract source information on the identified object.

In operation 715, the first electronic device 701 may make a request for information on the one or more selected objects by transmitting an information request message including source information on the one or more selected objects to the server 705.

In operation 717, when the information request message is received, the server may detect the information related to the one or more selected objects based on the source information included in the information request message.

In operation 719, the first electronic device 701 may receive an information transmission message including the requested information related to the one or more objects from the server.

In operation 721, the first electronic device 701 may transmit the information transmission message including the information related to the one or more objects to the second electronic device 703 so that the second electronic device 703 may display the information related to the one or more objects, which is included in the received information transmission message, or output the information through sound information.

In operation 723, when the second electronic device 703 receives the information transmission message, the second electronic device 703 may display the information related to the one or more objects, which is included in the information transmission message, or output the information through sound information.

According to various examples, when the information related to the one or more objects is updated, the second electronic device 703 may receive the updated information from the first electronic device 701, and display the updated information or output the updated information through sound information. According to various examples, when the information transmission message includes address information on the server or information-providing device that provides the information related to the one or more objects, the second electronic device 703 may directly receive the updated information from the corresponding server or information-providing device based on the address information, and display the updated information or output the updated information through sound information.

As described above, the first electronic device 701 may acquire the information related to the one or more selected objects from the server and acquire the information related to the one or more selected objects through an interworking with another application (for example, a second application) in addition to the currently executed application (for example, a first application).

Figure 8:
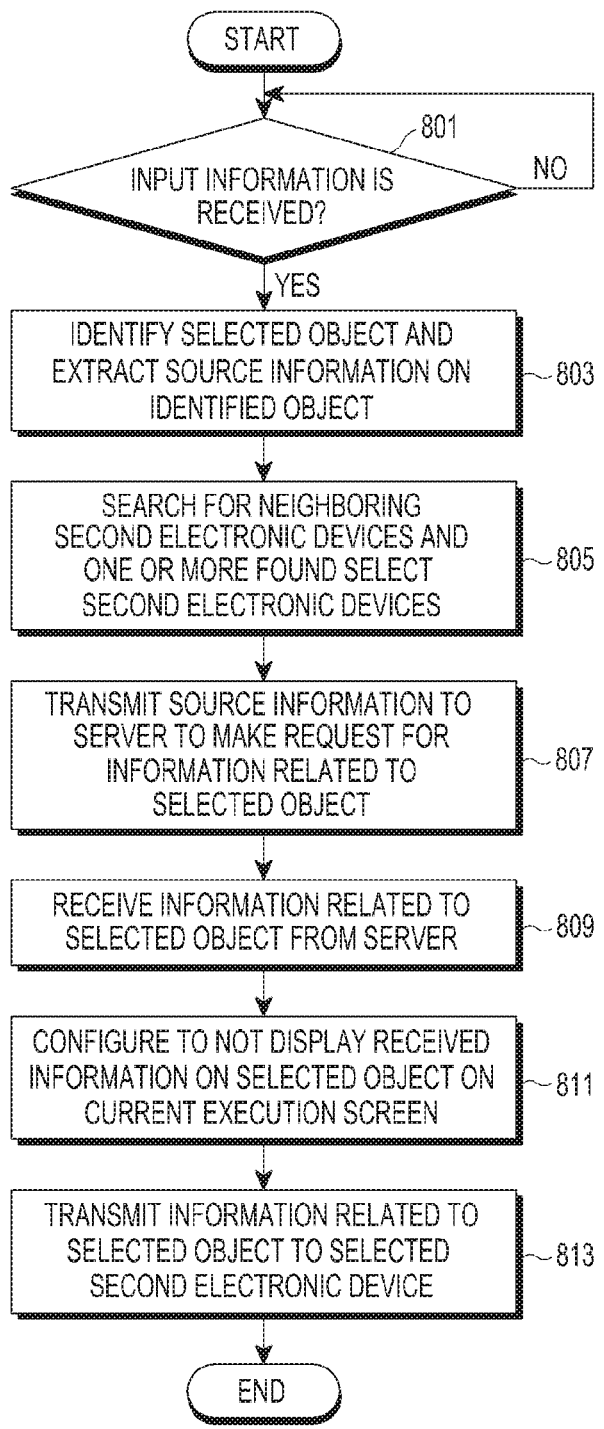
FIG. 8 is a flowchart illustrating an example operation process of a first electronic device.

FIG. 8 is a flowchart illustrating an example operation process of the first electronic device.

Referring to FIG. 8, for example, according to various examples of the disclosure, after one or more objects are selected within the execution screen of the executed application by the user, the first electronic device (for example, the first electronic device 701 of FIG. 7) may identify whether input information based on a transmission command of the selected objects is received in operation 801.

When the input information is not received based on a result of the identification, the first electronic device may continue to perform operation 801. When the input information on the transmission command is received, the first electronic device may identify the one or more selected objects in operation 803. According to various examples, when a position or area in which the one or more objects are displayed within the execution screen is selected by the user, the first electronic device may identify position information on the selected position or area and extract source information on the object corresponding to the position information identified from total source information of the execution screen.

When there is no second electronic device (for example, the second electronic device 103, 105, or 107 of FIG. 1 or the second electronic device 302 of FIG. 3) to which the information related to the one or more presently selected objects will be transmitted, the first electronic device may search for one or more neighboring second electronic devices and select at least one second electronic device from the found second electronic devices in operation 805. Operation 805 may not be performed or the sequence thereof may be changed based on conditions. According to various examples, the first electronic device may not perform operation 805 when there is the second electronic device which has been already connected.

In operation 807, the first electronic device may make a request for the information related to the one or more selected objects to the server based on the extracted source information.

In operation 809, the first electronic device may receive the found information related to the one or more objects according to the request from the server. According to various examples, the received information related to the one or more objects may include at least one of contents including at least one piece of information included in the extracted source information. The contents may, for example, be at least one of the contents in the form of an image, text, dynamic image, sound source, and a combination thereof according to the execution of another application or function. According to various examples, the first electronic device may interwork with another relevant application based on an information search result and the interworked application may receive contents related to the one or more selected objects from an external information-providing device or the server. According to various examples, the server may filter contents related to a configured service or function among the contents found based on a configured condition and provide effective contents to the first electronic device as the information related to the one or more objects. According to the aforementioned various examples, the information related to the one or more objects received from the server may be applied to other figures for describing an operation of receiving the information related to the one or more selected objects from the server as well as FIG. 8.

In operation 811, the first electronic device may be configured to not display the acquired information, for example, the information related to the one or more selected objects on the current execution screen. In operation 813, the first electronic device may transmit the information related to the one or more selected objects to the selected second electronic device.

According to various examples, when an update event for the information related to the one or more selected objects is generated, the first electronic device may transmit updated information to the second electronic device.

Figure 9:
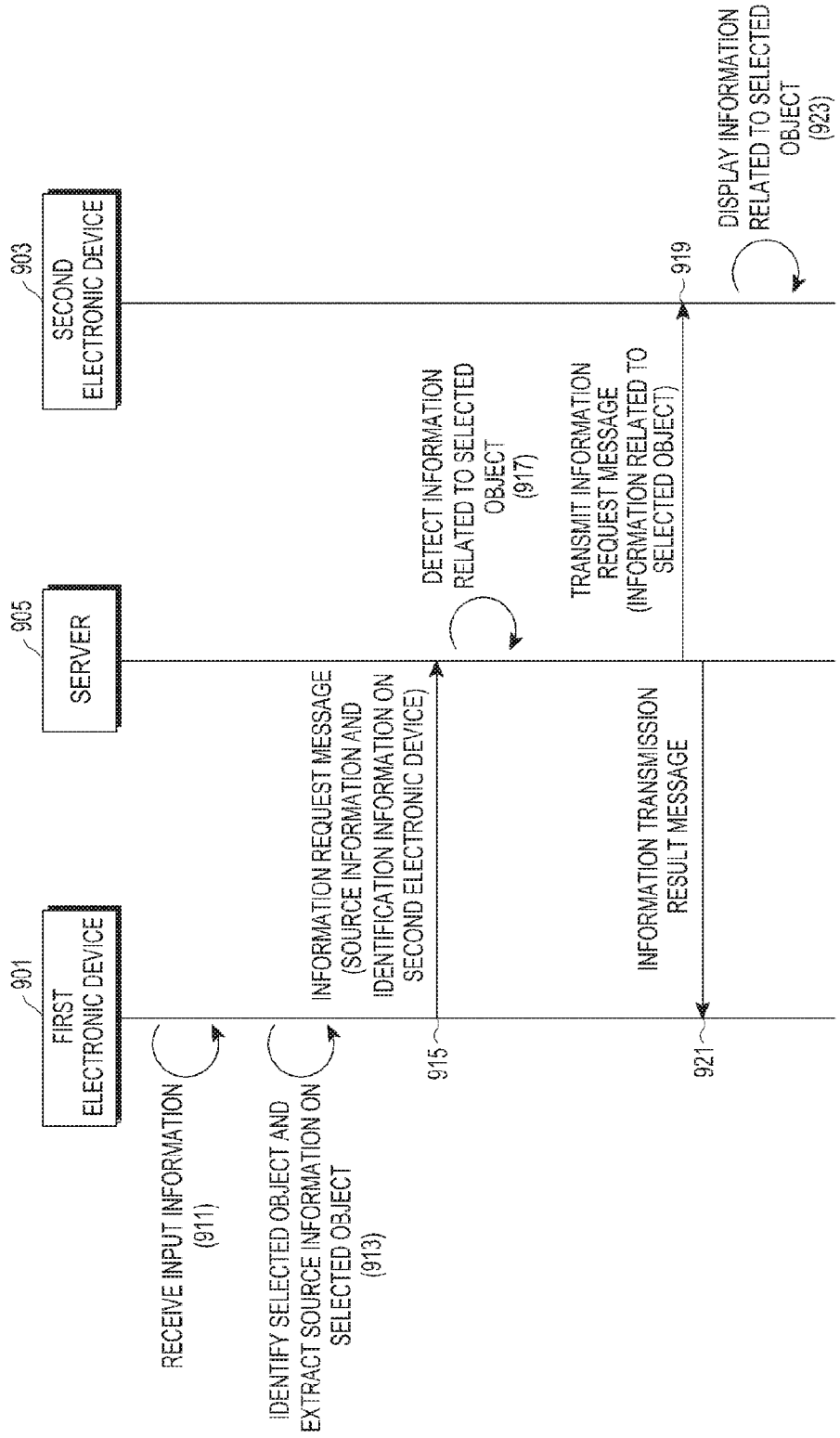
FIG. 9 is an operational diagram illustrating an example operation process for processing information between a first electronic device, a second electronic device, and a server.

FIG. 9 is an operational diagram illustrating an example operation process for processing information between a first electronic device, a second electronic device, and a server.

Referring to FIG. 9, according to various examples of the disclosure, when one or more objects are selected within an execution screen of an application executed by the user, a first electronic device 901 may receive first input information based on the selection of the one or more objects and second input information on a command (for example, at least one of a touch input, a key input, a gesture, and a pen input) for transmitting the one or more selected objects to a second electronic device 903 in operation 911. The first input information and the second input information may be received by input operations of the user, respectively, but is not limited thereto and may be received by one input operation of the user. According to various examples, when the user selects objects corresponding to one or more positions or areas within the execution screen, a transmission command of the selected objects may be input without a separate input of the user (for example, including at least one of a touch input, a key input, a gesture, and a pen input) in response to the operation of selecting the objects by the user. For example, when the one or more objects are selected by the user, the first electronic device 901 may perform an operation for transmitting information (for example, contents) related to the one or more selected objects according to the input information according to the selection of the one or more objects without receiving input information on a separate transmission command.

In operation 913, the first electronic device 901 may identify the one or more selected objects based on the received first input information. According to various examples, the first electronic device 901 may identify the first input information, for example, a position or area in which the selection is made by the user, and identify or extract information an object corresponding to the identified position or area.

In operation 915, the first electronic device 901 may make a request for the information related to the one or more selected objects by transmitting an information request message including analysis (or identification) result information (for example, source information) on the one or more selected objects and identification information on the selected second electronic device 903 to the server 905.

According to various examples, the server 905 may identify the received source information on the one or more objects to detect information related to the source information in operation 917.

In operation 919, the server 905 may transmit an information transmission message including the found information, for example, the information related to the one or more objects to the second electronic device 903 identified based on the identification information on the second electronic device.

In operation 921, the server 905 may transmit, to the first electronic device 901, an information transmission result message including result information based on the transmission of the information transmission message to the second electronic device 903.

In operation 923, when the second electronic device 903 receives the information transmission message, the second electronic device 903 may display the information related to the one or more objects, which is included in the information transmission message, or output the information through sound information.

According to various examples, when the information related to the one or more objects is updated, the second electronic device 903 may receive the updated information from the server 905, and display the updated information or output the updated information through sound information.

As described above, the first electronic device 901 may request the server to directly transmit the information related to the one or more selected objects to the second electronic device 903.

Figure 10:
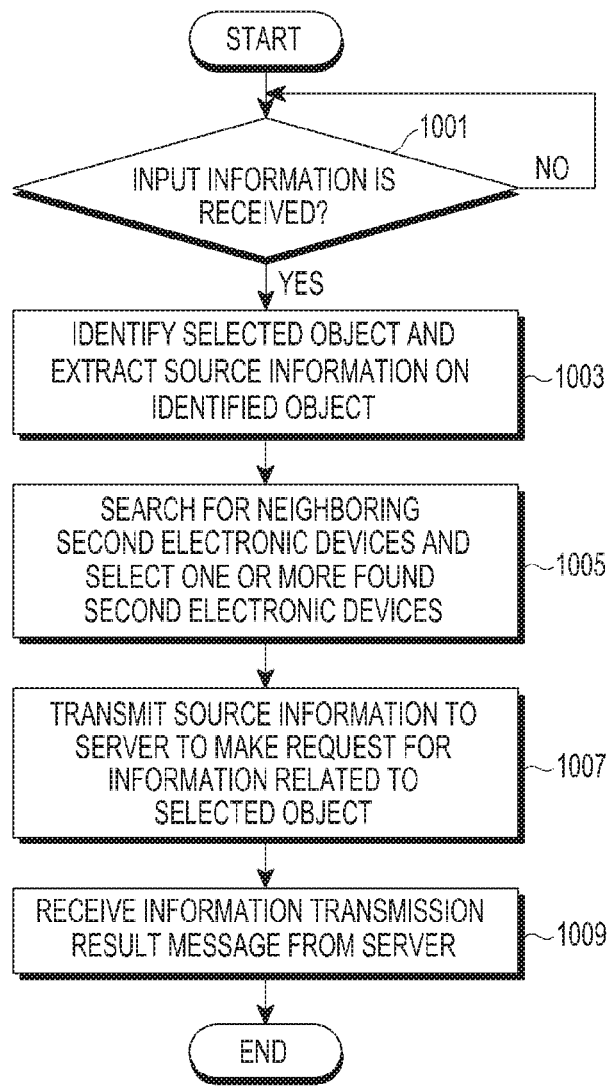
FIG. 10 is a flowchart illustrating an example operation process of a first electronic device.

FIG. 10 is a flowchart illustrating an example operation process of a first electronic device.

Referring to FIG. 10, for example, according to various examples of the disclosure, after one or more objects are selected within the execution screen of the executed application by the user, the first electronic device (for example, the first electronic device 101 of FIG. 1 or the first electronic device 901 of FIG. 9) may identify whether input information on a transmission command of the selected objects is received in operation 1001.

When the input information is not received based on a result of the identification, the first electronic device may continue to perform operation 1001. When the input information on the transmission command is received, the first electronic device may identify the one or more selected objects in operation 1003. According to various examples, when a position or area in which the one or more objects are displayed within the execution screen is selected by the user, the first electronic device may identify position information on the selected position or area and extract source information on the object corresponding to the position information identified from total source information of the execution screen in operation 1003.

When there is no second electronic device (for example, the second electronic device 103, 105, or 107 of FIG. 1 or the second electronic device 302 of FIG. 3) to which the information related to the one or more presently selected objects will be transmitted, the first electronic device may search for one or more neighboring second electronic devices and select at least one second electronic device from the found second electronic devices in operation 1005. Further, when second electronic devices exist, the first electronic device may select one or more second electronic devices. Operation 1005 may not be performed or the sequence thereof may be changed based on conditions. According to various examples, the first electronic device may not perform operation 1005 when there is the second electronic device which has been already connected.

In operation 1007, the first electronic device may make a request for the information on the one or more selected objects to the server based on extracted source information and may request the server to directly transmit the found information related to the one or more objects to the selected second electronic device by transmitting identification information on the selected second electronic device to the server.

In operation 1009, the first electronic device may receive an information transmission result message from the server. The information transmission result message may include result information based on the transmission of the information related to the one or more objects to the second electronic device.

When the server does not transmit the requested information to the second electronic device, the first electronic device may make a request for the information again to receive the information related to the one or more objects and transmit the received information related to the one or more objects to the second electronic device.

According to various examples, the received information related to the one or more objects may include at least one of contents including at least one piece of information included in the extracted source information. The contents may be at least one of the contents in the form of an image, text, dynamic image, sound source, and a combination thereof according to the execution of another application or function.

According to various examples, the server may filter contents related to a configured service or function among the contents found based on a configured condition and provide effective contents to the first electronic device as the information related to the one or more objects.

According to various examples, when an update event for the information related to the one or more objects is generated, the second electronic device may directly receive updated information from the server.

The information related to the one or more selected objects will be described as, for example, contents related to the one or more selected objects in various examples of the disclosure described below.

Figure 11:
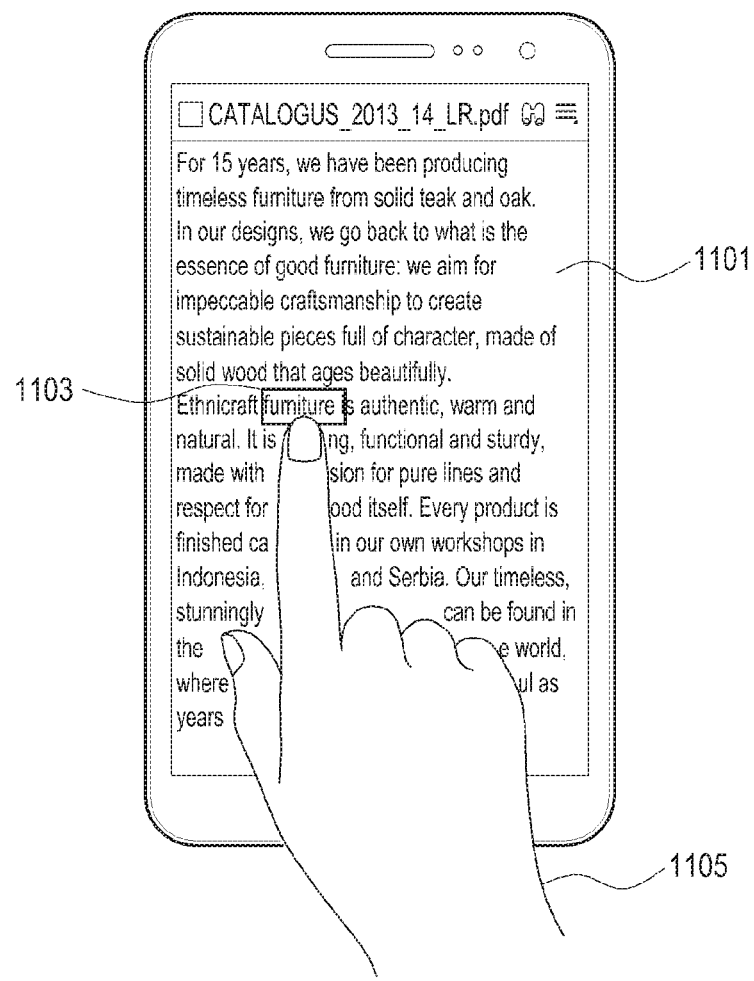
FIG. 11 illustrates an example screen for processing information by the first electronic device.
Figure 12A:
FIGS. 12A and 12B illustrate example screens for processing information between the first electronic device and the second electronic device.
Figure 12B:
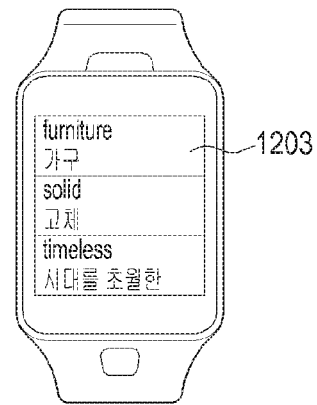

FIG. 11 is an illustration of an example screen for processing information by the first electronic device, and FIGS. 12A and 12B illustrate an example screen for processing information by the first electronic device and the second electronic device.

Referring to FIG. 11, according to various examples of the disclosure, the first electronic device may execute an application (for example, an application for viewing a document) and display an execution screen 1101 (for example, a document) of the application executed on the display unit.

When the user selects one or more objects (for example, one or more words or phrases within a document) within a document displayed on the execution screen as indicated by reference numeral 1105, the first electronic device may identify the one or more words or phrases selected by the user as indicated by reference numeral 1103 and search for the selected words or phrases (for example, source information on the selected words or phrases) or transmit the selected words or phrases to make a request for one or more contents related to the selected words or phrases. According to various examples, the first electronic device may search for one or more contents (for example, at least one of a meaning of the selected word or phrase, a translation to another language, a synonym, an antonym, and an example sentence of the selected word or phrase, and a document including the selected word or phrase) related to the selected words or phrases in a database of the storage unit to acquire one or more contents related to the selected words or phrases to be displayed in the second electronic device. According to various examples, source information on the selected words or phrases may include at least one piece of source information corresponding to the word or phrase included in a document (for example, an HTML document) displayed on the execution screen, address information (URL) providing the document, and information related to a query. Further, the source information on the selected words or phrases may include a source (for example, address information (URL)) to provide information related to the selected words. According to various examples, when information related to the selected words or phrases is requested from the address (URL) providing the document through the information related to the query included in the document, the address information (URL) providing the information related to the selected words or phrases may be provided through a response.

According to various examples, the first electronic device may interwork with another application to receive one or more contents related to the selected words through the other application (for example, at least one of a dictionary service, a translation service, a messenger service, and a search service application) According to various examples, the first electronic device may transmit the selected words to the server, receive contents related to the selected words from the server, and transmit the contents to the second electronic device or request the server to directly transmit the contents to the second electronic device. According to various examples, the first electronic device may acquire at least one of an advertisement, image, dynamic image, map, event, and messenger content including the selected words as the contents related to the selected words.

Referring to FIGS. 12A and 12B, according to various examples of the disclosure, the first electronic device may transmit the acquired contents related to the selected words to the second electronic device or request the server to directly transmit the contents to the second electronic device. The second electronic device may display the one or more contents 1203 (for example, acquired contents according to a dictionary service that may include, for example a translation) related to the selected words as illustrated in FIG. 12B. Since the first electronic device does not display the one or more contents related to the selected words as illustrated in FIG. 12A, the first electronic device may display an execution screen 1201 of the currently executed application without reducing, splitting, switching, or overlapping (for example, popup window) the screen while not covering the screen or not switching the screen according to the selected words.

Figure 13:
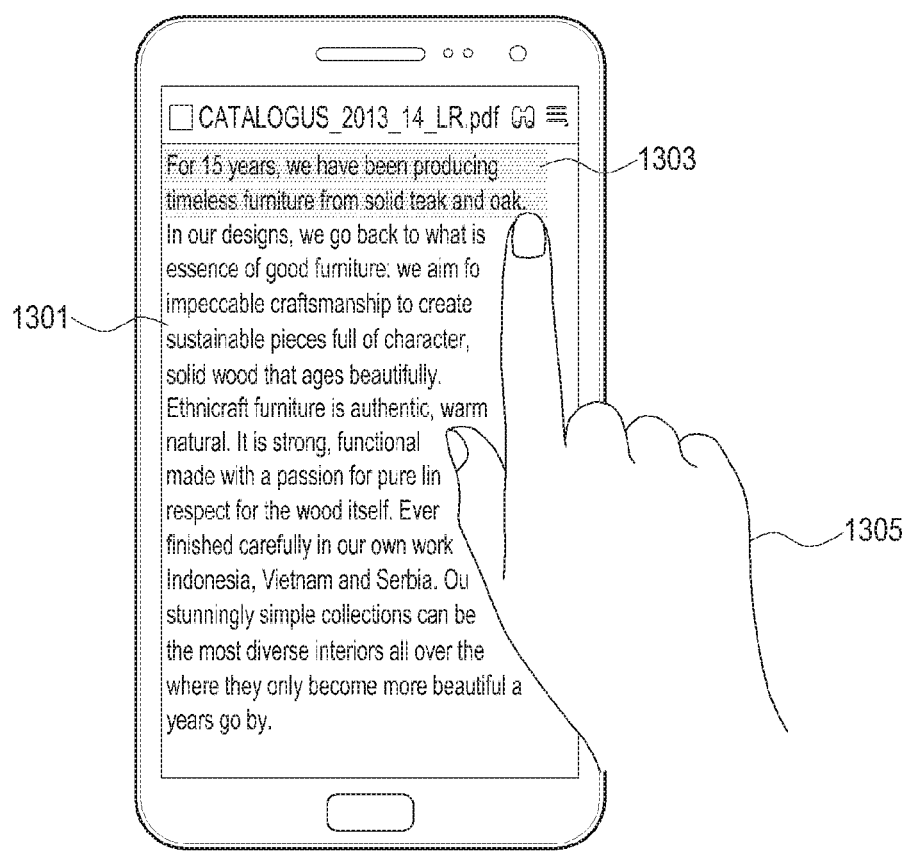
FIG. 13 illustrates an example screen for processing information by the first electronic device.
Figure 14A:
FIGS. 14A and 14B illustrate example screens for processing information between the first electronic device and the second electronic device.
Figure 14B:

FIG. 13 is an illustration of an example screen for processing information by the first electronic device, and FIGS. 14A and 14B illustrate an example screen example for processing information by the first electronic device and the second electronic device.

Referring to FIG. 13, according to various examples of the disclosure, the first electronic device may execute an application (for example, an application for viewing a document) and display an execution screen 1301 (for example, a document) of the application executed on the display unit.

When the user selects one or more objects (for example, a sentence in a predetermined area within a document) in a document displayed on the executed screen as indicated by reference numeral 1305, the first electronic device may identify the sentence 1303 selected by the user, and search for the selected sentence by using source information on the selected sentence (for example, source information on a frame corresponding to the selected sentence area) or make a request for one or more contents related to the selected sentence to the server. According to various examples, the source information on the selected sentence may include at least one of a source (for example, address information (URL)) providing a document of the executed application, a query sentence, and information on the selected sentence. Further, the source information on the selected sentence area may include a source (for example, address information (URL)) to provide the contents related to the selected sentence. According to various examples, when the contents related to the selected sentence are requested from the address (URL) providing the document through the information related to the query included in the document, the address information (URL) providing the contents related to the selected sentence may be provided through a response.

According to various examples, the first electronic device may receive the contents related to the selected sentence through another application (for example, at least one of a dictionary service, a translation service, and a search service application). According to various examples, the first electronic device may transmit source information on the selected sentence, receive the contents related to the selected sentence from the server, and transmit the contents to the second electronic device or request the server to directly transmit the contents to the second electronic device. According to various examples, the first electronic device may acquire, for example, translation information on the selected sentence or at least one of an advertisement, image, dynamic image, map, event, and messenger content including one or more words included in the selected sentence or a word having a specific mark.

Referring to FIGS. 14A and 14B, according to various examples of the disclosure, the first electronic device may transmit the contents related to the selected sentence to the second electronic device or request the server to directly transmit the contents to the second electronic device. The second electronic device may display the one or more contents 1403 (for example, translation information on the sentence acquired according to a dictionary service or a translation service) related to the selected sentence as illustrated in FIG. 14B. Since the first electronic device does not display the one or more contents related to the selected sentence as illustrated in FIG. 14A, the first electronic device may display an execution screen 1401 (for example, a document) of the currently executed application without reducing, splitting, switching, or overlapping (for example, popup window) the screen while not covering the screen or not switching the screen according to the selected sentence.

Figures 15A, 15B:
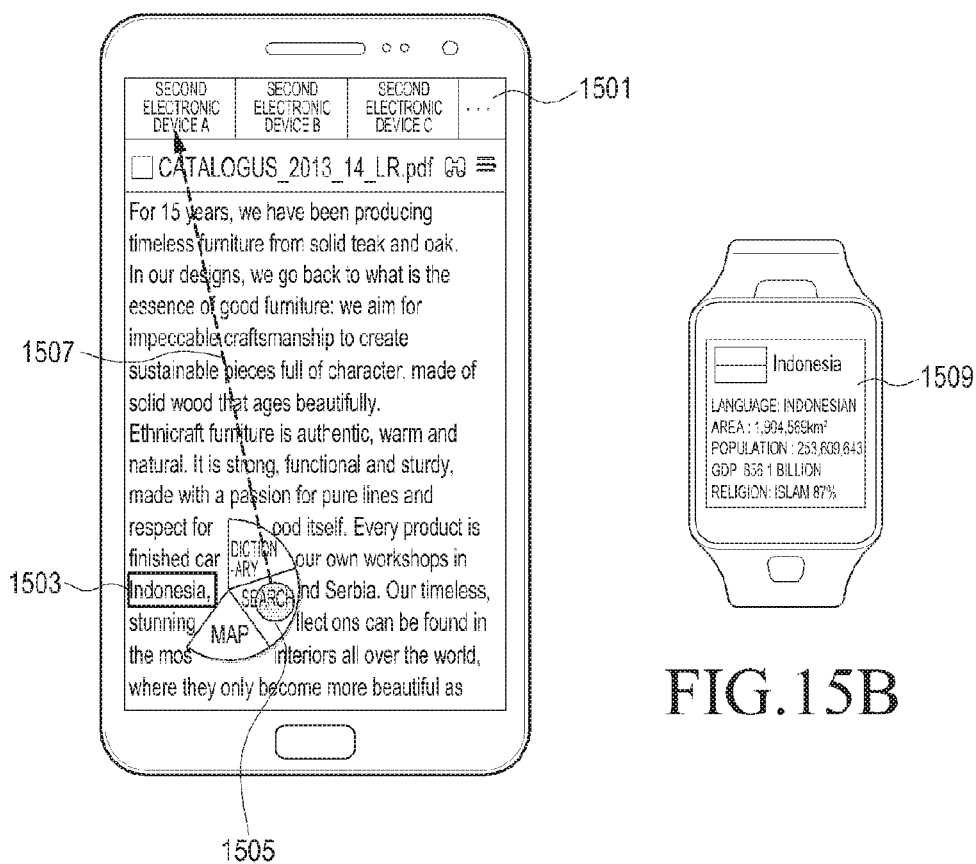
FIGS. 15A and 15B illustrate example screens for processing information between the first electronic device and the second electronic device.

FIGS. 15A and 15B illustrate example screens for processing information between the first electronic device and the second electronic device.

Referring to FIG. 15A, according to various examples of the disclosure, the first electronic device may receive input information on one or more objects (for example, at least one of a word, sentence, image, area, and frame) selected within an execution screen (for example, a document) of the currently executed application by the user. According to various examples, when at least one word 1503 is selected within the document by the user, the first electronic device may search for a service or function, with which the first electronic device can interwork, based, for example, on a preset condition, to receive contents related to the selected word and display the found service or function on the execution screen. According to various examples, when at least one selected object is a word, the first electronic device may display information 1505 (for example, at least one of a dictionary, search, and map) on a service or function (for example, another application) which can search for contents related to the selected word on the screen.

According to various examples of the disclosure, when at least one service or function (for example, search) is selected by the user from the display services or functions, the first electronic device may be configured to display the selected service or function in at least one second electronic device selected within a list of the second electronic devices displayed on the execution screen as indicated by reference numeral 1507. According to various examples, when the user selects the function displayed on the screen, the first electronic device may select the second electronic device displayed at a moved position through a user's particular gesture (for example, drag). Further, the first electronic device may search for neighboring second electronic devices and display identification information on the second electronic devices, which can perform communication, among the found second electronic devices on the execution screen in, for example, a list form 1501.

Referring to FIG. 15B, according to various examples of the disclosure, the first electronic device may search for the contents related to the selected word through the selected service or function (for example, search) to acquire contents related to the selected word or request the server, which provides the contents related to the selected word, to directly transmit the contents to the second electronic device. According to the acquisition or request for the contents related to the selected word by the first electronic device, the second electronic device may receive information related to the selected word from the first electronic device or the server and display the received information as indicated by reference numeral 1509 according to various examples of the disclosure. According to various examples, the second electronic device may output the received information through sound information.

According to various examples of the disclosure, since the first electronic device does not display one or more contents acquired in connection with the selected word, the first electronic device may display the execution screen of the currently executed application without reducing, splitting, switching, or overlapping (for example, popup window) the screen while not covering the screen or switching the screen based on the selected word.

Figures 16A, 16B:
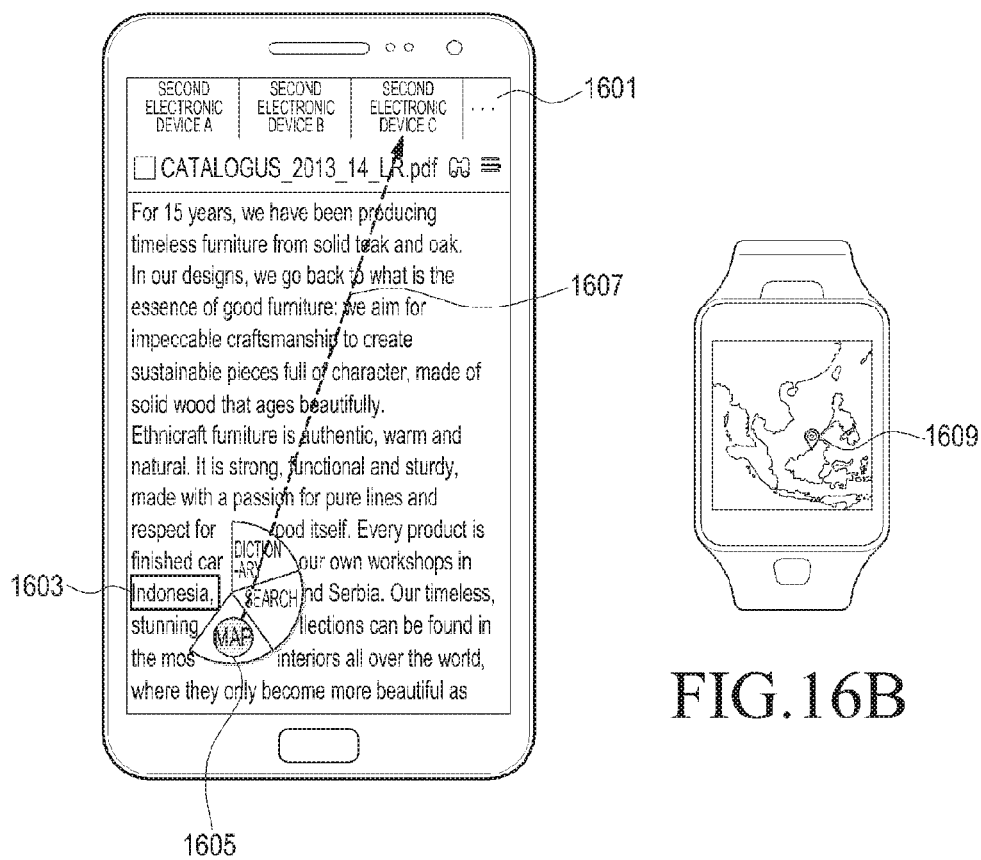
FIGS. 16A and 16B illustrate example screens for processing information between the first electronic device and the second electronic device.

FIGS. 16A and 16B illustrate example screens for processing information between the first electronic device and the second electronic device.

Referring to FIGS. 16A and 16B, according to various examples of the disclosure, when a service or function (for example, map) to search for at least one word 1603 selected by the user is selected, the first electronic device may be configured to display the selected service or function in at least one second electronic device selected within a list of the second electronic devices displayed on the execution screen as indicated by reference numeral 1607. According to various examples, when the user selects the function displayed on the screen, the first electronic device may select the second electronic device displayed at a moved position through a user's particular gesture (for example, drag). Further, the first electronic device may search for neighboring second electronic devices and display identification information on the second electronic devices, which can perform communication, among the found second electronic devices on the execution screen in, for example, a list form 1601.

The first electronic device may acquire one or more relevant contents found through a map service or request the server to directly transmit the contents to the second electronic device.

According to an example of the disclosure, the second electronic device may receive map information from the first electronic device as the one or more relevant contents and display the received map information as indicated by reference numeral 1609. According to various examples, the second electronic device may provide position information on the selected word by displaying a map.

According to various examples of the disclosure, since the first electronic device does not display one or more contents acquired in connection with the selected word, the first electronic device may display the execution screen of the currently executed application without reducing or overlapping (for example, popup window) the screen while not covering the screen or switching the screen according to the selected word.

Figures 17A, 17B:
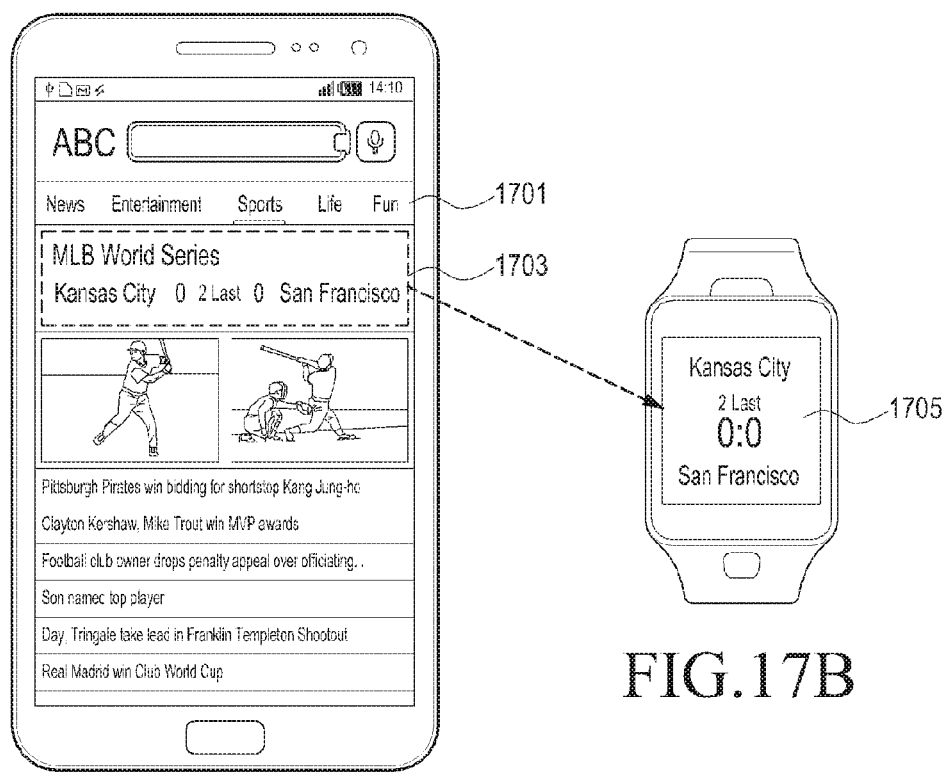
FIGS. 17A and 17B illustrate example screens for processing information between the first electronic device and the second electronic device.

FIGS. 17A and 17B illustrate example screens for processing information between the first electronic device and the second electronic device.

Referring to FIGS. 17A and 17B, according to various examples of the disclosure, the first electronic device may execute a web application and display a webpage 1701 on the execution screen. The first electronic device may select one or more objects (for example, one or more areas or a frame 1703 located in the one or more areas) within the webpage 1701 by the user, extract source information on the one or more selected objects, and search for contents related to the one or more selected objects based on the extracted source information or make a request for the contents to the server. According to various examples, the source information on the selected object may include at least one of a source (for example, address information (URL)) providing a document of the executed application, information related to a query, and information on the selected object. Further, the source information on the selected object may include a source (for example, address information (URL)) to provide the contents related to the selected object. According to various examples, when the contents related to the selected object are requested from the address (URL) providing the document through the information related to the query included in the document, the address information (URL) providing the contents related to the selected object may be provided through a response. According to various examples, the source information on the selected object may include a source (for example, address information (URL)) providing the selected object (for example, one or more areas or a frame located in the one or more areas). A source providing the one or more selected areas or the frame located in the one or more areas may be different from or the same as the source providing the whole document of the executed application.

According to various examples of the disclosure, the second electronic device may receive contents related to the one or more selected objects based on the search or request by the first electronic device and display the received contents 1705 related to the one or more objects. The contents related to the one or more objects may be at least one of all text (for example, "MLB World Series Telecast $2^{nd}$ Inning, KC 0:0 SF) included in the source information on the one or more selected frames, some contents (for example, "$2^{nd}$ Inning, KC 0:0 SF") 1705 including source information, and an image or dynamic image included in the source information. When the contents related to the one or more objects are displayed in the second electronic device, the first electronic device may display a webpage provided based on a screen input or a screen switching input by the user without displaying the contents related to the one or more objects.

Figure 18:
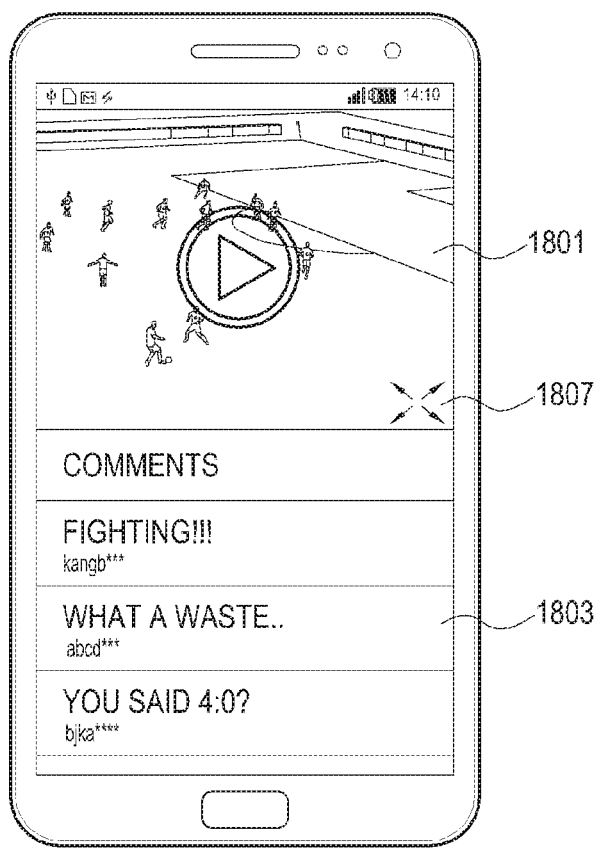
FIG. 18 illustrates an example screen for processing information by the first electronic device.
Figure 19A:
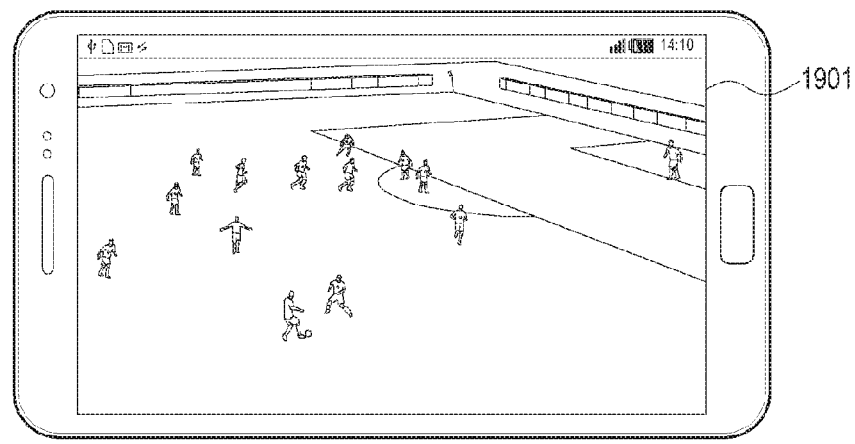
FIGS. 19A and 19B illustrate example screens for processing information between the first electronic device and the second electronic device.
Figure 19B:

FIG. 18 is an illustration of an example screen for processing information by the first electronic device, and FIGS. 19A and 19B illustrate example screens for processing information by the first electronic device and the second electronic device.

Referring to FIG. 18, according to various examples of the disclosure, the first electronic device may execute a web application or a messenger application to display, for example, information on a webpage, Internet TV, DMB, messenger, or social network service on the execution screen. According to various examples, the first electronic device may display a webpage including a dynamic image area 1801 and a comment area 1803. The first electronic device may select, for example, one or more objects (for example, comments) corresponding to a frame, a menu, or a position of a predetermined area within the displayed webpage by the user, extract source information (for example, text of the "comment") on the selected object (for example, the comment), and search for contents related to the selected object (for example, the comment) based on the extracted source information or make a request for the contents to the server. Further, when the user selects a screen expansion menu 1807 after selecting the comment, the first electronic device may display the dynamic image area 1801 on an entire execution screen. According to various examples, the source information on the selected object may include at least one of a source (for example, address information (URL)) providing a document of the executed application, a query sentence, and information on the selected object (for example, the comment). Further, the source information on the selected object may include a source (for example, address information (URL)) to provide the contents related to the selected object (for example, the comment). According to various examples, when the contents related to the selected object are requested from the address (URL) providing the document through the information related to the query included in the document, the address information (URL) providing the contents related to the selected object may be provided through a response. According to various examples, the source information on the selected object may include a source (for example, address information (URL)) providing the selected object (for example, the comment). The source providing the selected object (for example, the comment) may be different from or the same as the source providing the whole document of the executed application.

Referring to FIGS. 19A and 19B, according to various examples of the disclosure, the first electronic device may transmit contents related to the comments to the second electronic device based on the search or request. Further, the first electronic device may be configured to not display the received contents related to the comments on the execution screen, so that the first electronic device may display only contents on the dynamic image area without displaying the received contents related to the comments on the current execution screen as illustrated in FIG. 19A.

According to various examples of the present disclosure, the second electronic device may receive the contents related to the comments from the first electronic device or the server and display the received contents 1903 related to the comments. The displayed contents 1903 related to the comments may be at least one of, for example, comment content included in the comment area within the previously displayed webpage, a comment content provided after the comment is selected, and a comment content updated after the comment is selected. According to various examples, when the contents 1903 related to the comments are updated, the second electronic device may receive the updated contents related to the comments from the server, and display the updated contents related to the comments or output the updated contents related to the comments through sound information.

Figure 20:
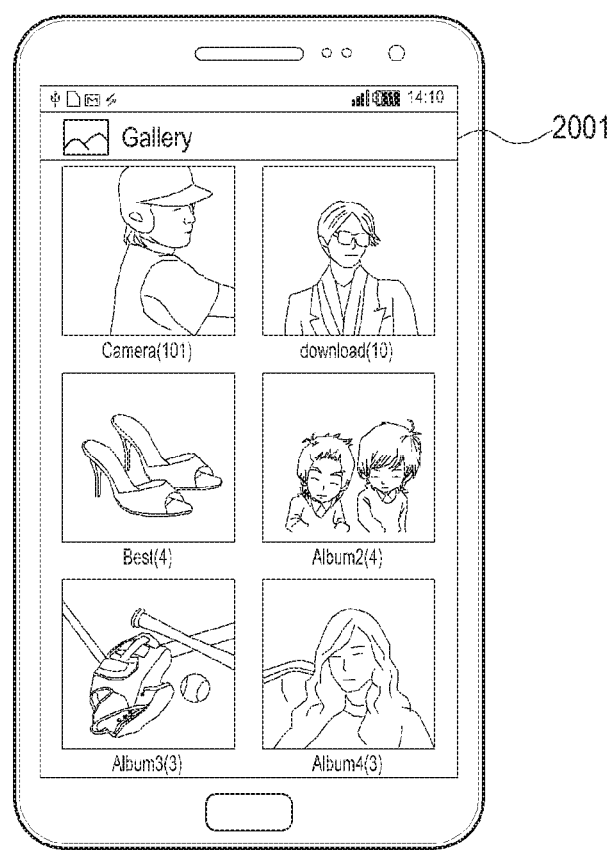
FIG. 20 illustrates an example screen for processing information by the first electronic device.

FIG. 20 illustrates an example screen for processing information by the first electronic device, and FIG. 21 illustrates an example screen for processing information by the first electronic device and the second electronic device.

Referring to FIG. 20, according to various examples of the disclosure, the first electronic device may execute an application for displaying a photo and may display a photo album list 2001 on an execution screen of the executed application. When at least one input of a configured gesture (for example, a long touch) and a pen input is detected within the execution screen, the first electronic device may search for contents (for example, the photo album list 2001) related to an object (a position or a predetermined area) within the current execution screen.

Referring to FIG. 21, according to various examples of the disclosure, when the photo is selected or an input for a transmission command is selected, the first electronic device may switch the screen to the selected photo or album to display the selected photo or album 2101 on the current execution screen. The first electronic device may be configured to not display contents related to the selected object on the current execution screen.

Figures 21A, 21B:
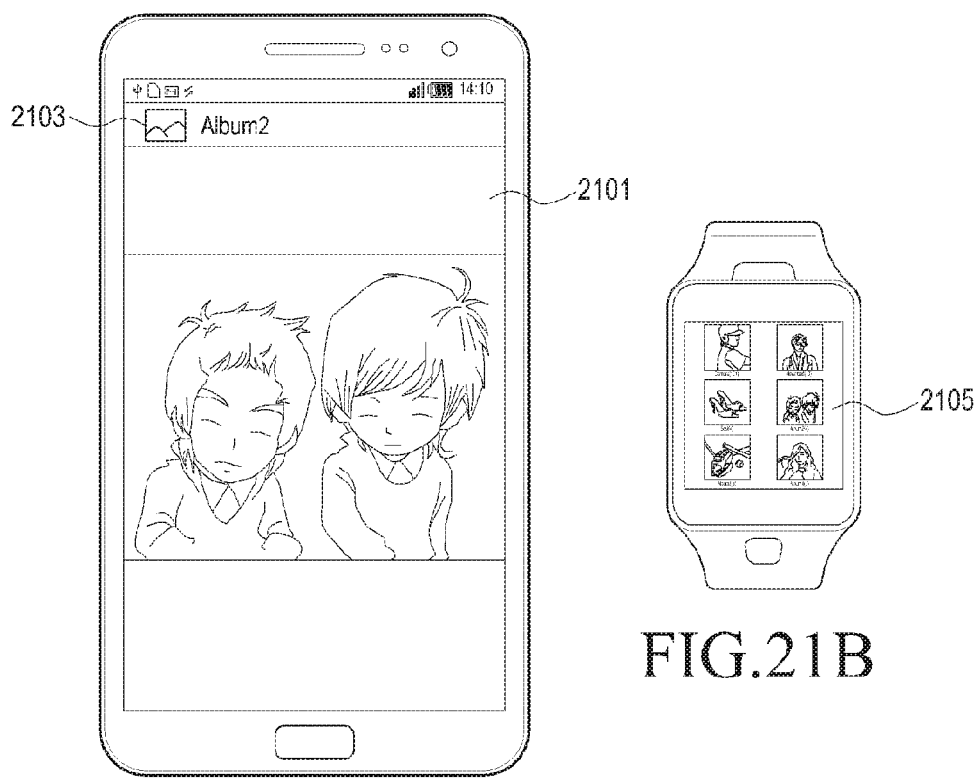
FIGS. 21A and 21B illustrate example screens for processing information between the first electronic device and the second electronic device.

According to various examples of the disclosure, the second electronic device may display the contents (for example, a photo album list 2105 as illustrated in FIG. 21B) related to the selected object received from the first electronic device or the server. According to various examples, the second electronic device may also receive and display source information on the selected photo after an input of a transmission command as well as displaying the photo album list displayed on the previous screen. According to various examples, the first electronic device may identify the source information on the selected photo and search for, as the contents related to the selected object, a photo according to a preset condition, for example, a photo taken a predetermined time before/after the identified selected photo is taken, a photo including some of the identified source information, or photos including a person equal to that included in the selected photo through an interworking with another application (for example, a person identification program). Further, the first electronic device may transmit the photos found based, for example, on the preset condition so that the second electronic device may display the photos as the contents related to the selected object.

According to various examples, when the input of the transmission command of FIG. 20 is received, the first electronic device may transmit the source information on the selected object to the server. The server having received the source information may search for stored photos through a cloud service, and directly transmit one or more photos related to the selected object to the second electronic device so that the second electronic device displays the photos or transmit the photos to the first electronic device.

According to various examples, when the first electronic device receives a particular input (for example, including at least one of a touch input, key input, gesture input, pen input, and other inputs) for an album menu 2103 on the current execution screen as illustrated in FIG. 21A, the first electronic device may transmit contents (for example, the photo album list 2105 as illustrated in FIG. 21B) related to the selected object to the second electronic device.

According to various examples, the first electronic device may search for a memo of a photo included in an album configured through an album creation function, transmit the found memo to the second electronic device, and make the second electronic device display the found memo as the contents related to the selected object without displaying the found memo on the current execution screen.

The various examples of the disclosure have been described with reference to FIGS. 11 to 21 and may be implemented according to one or more operation processes of FIGS. 5 to 10, and the first electronic device or the second electronic device may combine one or more operation processes of FIGS. 5 to 10 to implement an operation according to various examples of the disclosure. Further, the first electronic device or the second electronic device may combine one or more operation processes of FIGS. 5 to 10 and one or more of various examples of the disclosure according to the screen examples of FIGS. 11 to 21 to implement the operation.

Figure 22:
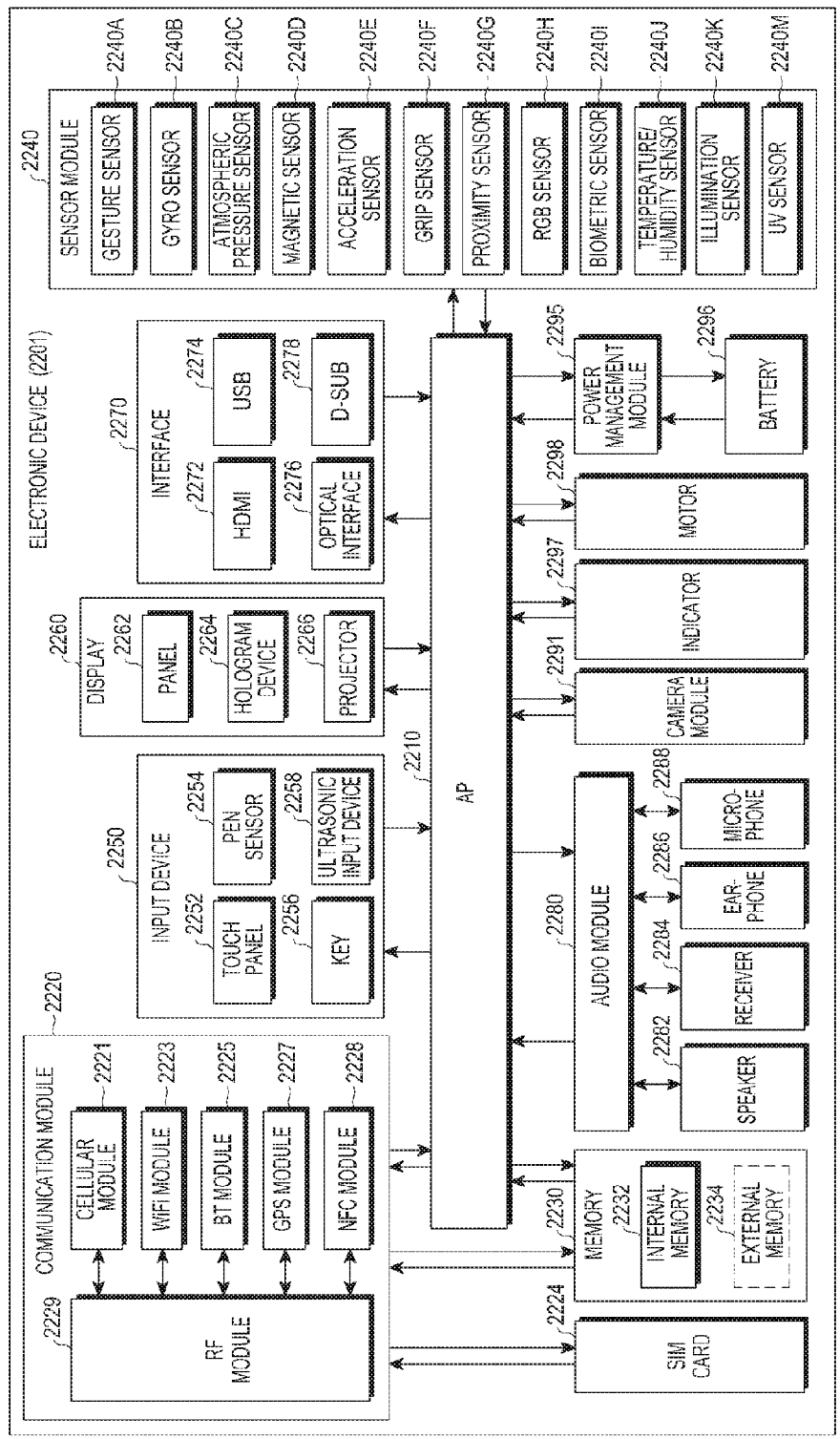
FIG. 22 is a block diagram illustrating an example structure of an electronic device.

FIG. 22 is a block diagram illustrating an example electronic device 2201. The electronic device 2201 may constitute, for example, all or a part of the first electronic device 101 or the second electronic device 103, 105, or 107 illustrated in FIG. 1. Referring to FIG. 22, the electronic device 2201 may include at least one Application Processor (AP) 2210, a communication module 2220, a Subscriber Identifier Module (SIM) card 2224, a memory 2230, a sensor module 2240, an input device 2250, a display 2260, an interface 2270, an audio module 2280, a camera module 2291, a power management module 2295, a battery 2296, an indicator 2297, and a motor 2298.

At least one AP 2210 may control a plurality of hardware or software components connected to at least one AP 2210 by driving, for example, an operating system or an application program and perform a variety of data processing and calculations. At least one AP 2210 may be implemented by, for example, a System on Chip (SoC). According to an example, at least one AP 2210 may further include a Graphic Processing Unit (GPU) and/or an image signal processor. At least one AP 2210 may also include at least some (for example, a cellular module 2221) of the components illustrated in FIG. 22. At least one processor 2210 may load, into a volatile memory, instructions or data received from at least one (for example, a non-volatile memory) of the other elements and may process the loaded instructions or data, and may store various data in a non-volatile memory.

The communication module 2220 may have components similar to, for example, those of the communication unit 210 of FIG. 2. The communication module 2220 may include, for example, a cellular module 2221, a Wi-Fi module 2223, a BT module 2225, a GPS module 2227, an NFC module 2228, and a Radio Frequency (RF) module 2229.

The cellular module 2221 may provide a voice call, video call, text message services, or Internet services through, for example, a communication network. According to an example, the cellular module 2221 may identify and authenticate the electronic device 2201 within a communication network by using a subscriber identification module (for example, the SIM card 2224). According to an example, the cellular module 2221 may perform at least some functions that at least one AP 2210 may provide. According to an example, the cellular module 2221 may include a communication processor (CP).

The Wi-Fi module 2223, the BT module 2225, the GPS module 2227, and the NFC module 2228 may include, for example, a processor for processing data transmitted/received through the corresponding module. According to some examples, at least some (for example, two or more) of the cellular module 2221, the Wi-Fi module 2223, the BT module 2225, the GPS module 2227, and the NFC module 2228 may be included in one Integrated Chip (IC) or IC package.

The RF module 2229 may transmit/receive, for example, a communication signal (for example, an RF signal). The RF module 2229 may include, for example, a transceiver, a Power Amp Module (PAM), a frequency filter, a Low Noise Amplifier (LNA), or an antenna. According to another example, at least one of the cellular module 2221, the WIFI module 2223, the BT module 2225, the GPS module 2227, and the NFC module 2228 may transmit/receive an RF signal through a separate RF module.

The SIM card 2224 may include a card including a subscriber identification module and/or an embedded SIM, and contain unique identification information (for example, an Integrated Circuit Card Identifier (ICCID)) or subscriber information (for example, an International Mobile Subscriber Identity (IMSI)).

The memory 2230 may have components similar to, for example, those of the storage unit 230 of FIG. 2. The memory may include, for example, an internal memory 2232 or an external memory 2234. The internal memory 2232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard drive, or a Solid State Drive (SSD).

The external memory 2234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 2234 may be functionally and/or physically connected to the electronic device 2201 through various interfaces.

The sensor module 2240 may have a configuration partially similar to, for example, the input unit 220 of FIG. 2, and may sense input information (for example, a gesture input) corresponding to a command for transmitting information related to one or more objects. The sensor module 2240 may measure a physical quantity or detect an operation state of the electronic device 2201, and may convert the measured or detected information into an electrical signal. The sensor module 2240 may include, for example, at least one of a gesture sensor 2240A, a gyro sensor 2240B, an atmospheric pressure sensor 2240C, a magnetic sensor 2240D, an acceleration sensor 2240E, a grip sensor 2240F, a proximity sensor 2240G a color sensor 2240H (for example, red, green, and blue (REB) sensor), a biometric sensor 2240I, a temperature/humidity sensor 2240J, an illumination sensor 2240K, and an Ultra Violet (UV) sensor 2240M. Additionally or alternatively, the sensor module 2240 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 2240 may further include a control circuit for controlling at least one sensor included therein. According to some examples, the electronic device 2201 may further include a processor that is configured as a part of at least one AP 2210 or a separate element from at least one AP 2210 to control the sensor module 2240, thereby controlling the sensor module 2240 while at least one AP 2210 is in a sleep state.

The input device 2250 may have a configuration similar to, for example, the input unit 220 of FIG. 2. The input device 2250 may include, for example, a touch panel 2252, a (digital) pen sensor 2254, a key 2256, or an ultrasonic input device 2258. The touch panel 2252 may use at least one of, for example, a capacitive type, a resistive type, an infrared type, and an ultrasonic type. The touch panel 2252 may further include a control circuit. The touch panel 2252 may further include a tactile layer, and provide a tactile reaction to a user.

The (digital) pen sensor 2254 may include, for example, a recognition sheet which is a part of the touch panel or a separate recognition sheet. The key 2256 may include, for example, a physical button, an optical key or a keypad. The ultrasonic input unit 2258 may input data through an input means that generates an ultrasonic signal, and the electronic device 2201 identify data by detecting a sound wave with a microphone (for example, a microphone 2288).

The display 2260 may have a configuration similar to, for example, the display unit 240 of FIG. 2. The display 2260 may include a panel 2262, a hologram device 2264 or a projector 2266. The panel 2262 may include a component equal or similar to the display unit 240 of FIG. 2. The panel 2262 may be embodied to be, for example, flexible, transparent, or wearable. The panel 2262 may also be configured to be integrated with the touch panel 2252 as a single module. The hologram device 2264 may show a stereoscopic image in the air by using interference of light. The projector 2266 may project light onto a screen to display an image. For example, the screen may be located inside or outside the electronic device 2201. According to an example of the disclosure, the display 2260 may further include a control circuit for controlling the panel 2262, the hologram device 2264, or the projector 2266.

The interface 2270 may include, for example, a High-Definition Multimedia Interface (HDMI) 2272, a Universal Serial Bus (USB) 2274, an optical interface 2276, or a D-subminiature (D-sub) 2278. The interface 2270 may be included in, for example, the communication unit 210 illustrated in FIG. 2. Additionally or alternatively, the interface 2270 may include, for example, a Mobile High-definition Link (MHL) interface, a Secure Digital (SD) card/MultiMedia Card (MMC) interface, or an Infrared Data Association (IrDA) standard interface.

The audio module 2280 may bilaterally convert, for example, a sound and an electrical signal. At least some components of the audio module 2280 may be included in, for example, the sound source output unit (not shown) described in FIG. 2. The audio module 2280 may process sound information input or output through, for example, a speaker 2282, a receiver 2284, earphones 2286, or a microphone 2288.

The camera module 2291 may photograph, for example, a still image or a moving image, and, according to one example, may include one or more image sensors (for example, a front sensor or a rear sensor), a lens, an Image Signal Processor (ISP), or a flash (for example, an LED or a xenon lamp).

The power management module 2295 may manage, for example, power of the electronic device 2201. According to an example, the power management module 2295 may include a Power Management Integrated Circuit (PMIC), a charger Integrated Circuit (IC), or a battery or fuel gauge. The PMIC may have a wired and/or wireless charging scheme. The wireless charging method may include, for example, a magnetic resonance method, a magnetic induction method, an electromagnetic method, and the like. Additional circuits, for example, a coil loop, a resonance circuit, or a rectifier for wireless charging may be further included. The battery gauge may measure, for example, the remaining amount of battery 2296, a charging voltage and current, or temperature. The battery 2296 may include, for example, a rechargeable battery and/or a solar battery.

The indicator 2297 may show particular statuses of the electronic device 2201 or a part (for example, the AP 2210) of the electronic device 2201, for example, a booting status, a message status, a charging status and the like. The motor 2298 may convert an electrical signal into mechanical vibrations, and may generate a vibration or haptic effect. Although not illustrated, the electronic device 2201 may include a processing device (for example, a GPU) for supporting mobile TV. The processing device for supporting mobile TV may process media data according to a standard of Digital Multimedia Broadcasting (DMB), Digital Video Broadcasting (DVB), media flow or the like.

Each of the components of the electronic device according to the disclosure may be implemented by one or more components and the name of the corresponding component may vary depending on a type of the electronic device. In various examples, the electronic device may include at least one of the above-described elements. Some of the above-described elements may be omitted from the electronic device, or the electronic device may further include additional elements. Further, some of the components of the electronic device according to the various examples of the disclosure may be combined to form a single entity, and thus, may equivalently execute functions of the corresponding elements prior to the combination. For example, the electronic device of FIG. 1 or FIG. 2 may include at least one of the elements of the electronic device as described above.

Figure 23:
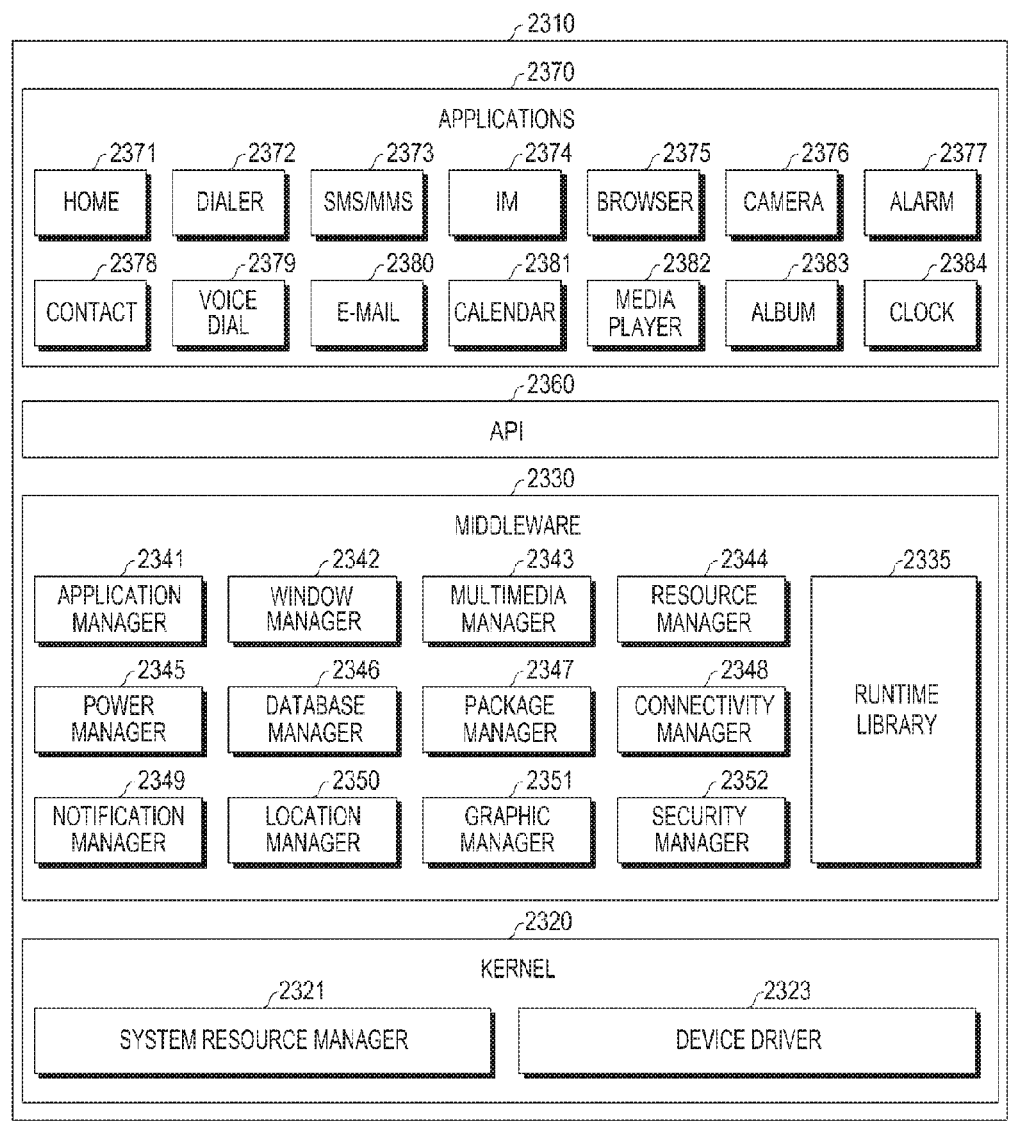
FIG. 23 is a block diagram illustrating an example structure of an electronic device.

FIG. 23 is a block diagram illustrating an example program module 2310. According to various examples, the program module 2310 (for example, the program) may include an Operating System (OS) for controlling resources related to the electronic device (for example, the first electronic device 101 or the second electronic device 103, 105, or 107 of FIG. 1) and/or various applications executed in the operating system. The operating system may be, for example, Android, iOS, Windows, Symbian, Tizen, Bada, or the like.

The program module 2310 may include a kernel 2320, middleware 2330, an Application Programming Interface (API) 2360, and/or applications 2370. At least some of the program module 2310 may be preloaded in the electronic device or downloaded from the server (for example, the server 109 of FIG. 1).

The kernel 2320 may include, for example, a system resource manager 2321 or a device driver 2323. The system resource manager 2321 may control, allocate, or collect the system resources. According to an example, the system resource manager 2321 may include a process management unit, a memory management unit, or a file system management unit. The device driver 2323 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 2330 may provide a function required by the applications 2370 in common or provide various functions to the applications 2370 through the API 2360 so that the applications 2370 can efficiently use limited system resources within the electronic device. According to an example, the middleware 2330 may include at least one of a run time library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, and a security manager 2352.

The run time library 2335 may include, for example, a library module that a compiler uses in order to add new functions through a programming language while the applications 2370 are executed. The run time library 2335 may perform input/output management, memory management, or a function for an arithmetic function.

For example, the application manager 2341 may manage a life cycle of at least one of the applications 2370. The window manager 2342 may manage a GUI resource used in a screen. The multimedia manager 2343 may detect a format required for reproducing various media files and encode or decode a media file using a codec appropriate for the corresponding format. The resource manager 2344 may manage resources, such as a source code, a memory, or a storage space, of at least one of the applications 2370.

The power manager 2345 may operate together with, for example, a Basic Input/Output System (BIOS), so as to manage a battery or power and may provide power information required for the operation of the electronic device. The database manager 2346 may generate, search for, or change a database to be used by at least one of the applications 2370. The package manager 2347 may manage the installation or the updating of applications distributed in a package file form.

For example, the connectivity manager 2348 may manage wireless connections, such as Wi-Fi or Bluetooth. The notification manager 2349 may display or notify an event such as a received message, an appointment, a proximity notification, and the like to a user without disturbance. The location manager 2350 may manage location information of the electronic device. The graphic manager 2351 may manage graphic effects to be provided to a user and user interfaces related to the graphic effects. The security manager 2352 may provide various security functions required for system security or user authentication. According to an example, when the electronic device (for example, the first electronic device 101 or the second electronic device 103, 105, or 107 of FIG. 1) has a telephone call function, the middleware 2330 may further include a telephony manager for managing a voice or video call function of the electronic device.

The middleware 2330 may include a middleware module for forming a combination of various functions of the aforementioned components. The middleware 2330 may provide modules specialized according to the type of OS in order to provide differentiated functions. In addition, a few existing components may be dynamically removed from the middleware 2330, or new components may be added to the middleware 230.

The API 2360 may be, for example, a set of API programming functions and may include different components according to the operating system. For example, with respect to each platform, one API set may be provided in a case of Android or iOS, and two or more API sets may be provided in a case of Tizen.

The applications 2370 may include, for example, one or more applications which can provide functions such as home 2371, dialer 2372, SMS/MMS 2373, Instant Message (IM) 2374, browser 2375, camera 2376, alarm 2377, contacts 2378, voice dial 2379, email 2380, calendar 2381, media player 2382, album 2383, clock 2384, health care (for example, measure exercise quantity or blood sugar), or environment information (for example, atmospheric pressure, humidity, or temperature information).

According to various examples, the applications 2370 may include an application (hereinafter, referred to as an "information exchange application" for convenience of the description) supporting information exchange between the electronic device (for example, the first electronic device 101 of FIG. 1) and external electronic devices (for example, the second electronic device 103, 105, or 107 and the server 109). The information exchange application may include, for example, a notification relay application for transmitting predetermined information to the external electronic device, or a device management application for managing the external electronic device.

For example, the notification relay application may include a function of transferring, to the external electronic device, notification information generated from the other applications of the electronic device (for example, the SMS/MMS application, the e-mail application, the health management application, and the environmental information application). Further, the notification relay application may receive notification information from, for example, an external electronic device and provide the received notification information to a user. For example, the device management application may manage (for example, install, delete, or update) at least one function of the external electronic device communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an example, the applications 2370 may include an application (for example, health management application) designated based on attributes of the external electronic device (for example, attributes of the electronic device such as the type of electronic device which corresponds to a mobile medical device). According to an example, the applications 2370 may include an application received from the external electronic device. According to an example, the applications 2370 may include a preloaded application or a third party application that can be downloaded from a server. The names of the components of the program module 2310 of the illustrated example of the disclosure may be changed according to the type of operating system.

According to various examples, at least a part of the programming module 2310 may be implemented in software, firmware, hardware, or a combination of two or more thereof. At least some of the programming module 2310 may be implemented (for example, executed) by, for example, the processor (for example, the AP 2310). At least some of the programming module 2310 may include, for example, a module, program, routine, sets of instructions, process, or the like for performing one or more functions.

The term "module" or "functional unit" used herein may, for example, mean a unit including one of hardware (e.g., circuitry), software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" or "function unit" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various examples, at least some of the devices (for example, modules or functions thereof) or the method (for example, operations) according to the disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various examples of the disclosure may include at least one of the above described elements, exclude some of the elements, or further include other additional elements. The operations performed by the modules, programming module, or other elements according to various examples of the disclosure may be executed in a sequential, parallel, repetitive, or heuristic manner. Further, some operations may be executed according to another order or may be omitted, or other operations may be added.

According to various examples, a computer-readable recording medium having a program recorded therein to be executed in a computer is provided. The program may include a process to be executed by a processor. The process may include: executing an application in the first electronic device; receiving an input for transmitting contents related to one or more objects displayed within an execution screen of the application to a second electronic device; and transmitting the contents related to the one or more selected objects to the second electronic device in response to the input.

Various examples of the disclosure disclosed herein and the drawings are merely examples presented in order to describe technical details of the disclosure and to aid in understanding of the disclosure, and are not intended to limit the scope of the disclosure. Therefore, it should be understood that, in addition to the examples disclosed herein, all modifications and changes or modified and changed forms derived from the technical idea of various examples of the disclosure fall within the scope of the disclosure.

What is claimed is:
1. A first electronic device comprising:
a display;
a communication interface comprising interface circuitry; and
a processor operatively coupled to the display and the communication interface, wherein the processor is configured to:
control the display to display, on an execution screen of a first application displayed on the display, objects of the first application executed in the first electronic device;
in response to receiving an input for selection of one of the objects of the first application, identify at least one second electronic device, which can perform communication with the first electronic device and which is located within a communication proximity of the first electronic device;
control the display to display, on the execution screen, information related to the at least one second electronic device without overlapping with the objects of the first application;
control the display to display, on the execution screen, a plurality of different selectable functions related to the selected object, the selectable functions at least partially overlapping at least some of the objects on the execution screen;
when one of the plurality of different selectable functions for the object is selected, obtain content related to the selected object using a second application executed according to the selected function; and
control the communication interface to transmit the obtained content to the at least one second electronic device for displaying the obtained content on the at least one second electronic device, so that the obtained content is to be displayed on the at least one second electronic device without displaying the obtained content on the first electronic device.

2. The first electronic device of claim 1, wherein, the processor is configured to transmit updated content to the second electronic device when the content related to the selected object is updated.

3. The first electronic device of claim 1, wherein the processor is configured to search for the content related to the selected object based on source information on the selected object.

4. The first electronic device of claim 1, wherein the processor is configured to request the contents related to the selected object from a server based on source information of the selected object and to receive the content from the server based on the request.

5. The first electronic device of claim 1, wherein the processor is configured to transmit source information of the selected object and identification information of the second electronic device to a server,
wherein the content related to the selected object is obtained, by the server, based on the source information and the identification information, and the obtained content is transmitted from the server to the second electronic device.

6. The first electronic device of claim 1, wherein the processor is configured to interwork with another application related to the selected object based on source information of the selected object and to obtain the contents related to the selected object through the another application.

7. The first electronic device of claim 1, wherein, the processor is configured to obtain the content related to the selected object when one or more gestures are input to the first electronic device.

8. The first electronic device of claim 1, wherein, when at least one object is selected within a previous execution screen of the first application and one or more gestures are input on the execution screen, the processor is configured to:
obtain another content related to the at least one object selected within the previous execution screen; and
transmit the obtained another content to the second electronic device without displaying the another content on the execution screen.

9. A method of processing information by a first electronic device, the method comprising:
executing a first application in the first electronic device;
controlling the display of the first electronic device to display, on an execution screen of the first application displayed on the display, objects of the first application executed in the first electronic device;
in response to receiving an input for selection of one of the objects of the first application, identifying at least one second electronic device, which can perform communication with the first electronic device and which is located within a communication proximity of the first electronic device;
controlling the display to display, on the execution screen, information related to the at least one second electronic device without overlapping with the objects of the first application;
controlling the display to display, on the execution screen, a plurality of different selectable functions related to the selected object, the selectable functions at least partially overlapping at least some of the objects on the execution screen;
when one of the plurality of different selectable functions for the selected object is selected, obtaining content related to the selected object for using a second application executed according to the selected function; and
transmitting the obtained content to the at least one second electronic device for displaying the obtained content on the at least one second electronic device, so that the obtained content is to be displayed on the at least one second electronic device without displaying the obtained content on the display of the first electronic device.

10. The method of claim 9, further comprising, transmitting updated content to the second electronic device when the content related to the selected object is updated.

11. The method of claim 9, wherein the obtaining content related to the selected object comprises searching the contents related to the selected object, based on source information on the at least one object.

12. The method of claim 9, wherein the obtaining content related to the selected object comprises:
requesting the contents related to the selected object from a server based on source information on the selected object; and
receiving the contents related to the selected object from the server based on the request.

13. The method of claim 9, wherein obtaining content related to the selected object comprises:
transmitting source information of the selected object and identification information of the second electronic device to a server
wherein the content related to the selected object is obtained, by the server, based on the source information and the identification information, and the obtained content is transmitted from the server to the second electronic device.

14. The method of claim 9, wherein the obtaining content related to the selected object comprises:
interworking with another application related to the selected object based on source information of the selected at least one object; and
obtaining the contents related to the selected object through the other application.

15. The method of claim 9, further comprising:
receiving one or more gestures input on the execution screen after at least one object is selected within a previous execution screen of the application;
obtaining another content related to the at least one object selected within the previous execution screen; and
transmitting the obtained another content to the second electronic device without displaying the another content on the execution screen of the first electronic device.

* * * * *